(12) United States Patent
Shamaie

(10) Patent No.: US 8,515,132 B2
(45) Date of Patent: *Aug. 20, 2013

(54) TRACKING BIMANUAL MOVEMENTS

(75) Inventor: Atid Shamaie, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,492

(22) Filed: Aug. 1, 2012

(65) Prior Publication Data

US 2012/0293408 A1    Nov. 22, 2012

Related U.S. Application Data

(63) Continuation of application No. 11/932,766, filed on Oct. 31, 2007, now Pat. No. 8,259,996, which is a continuation of application No. 11/106,729, filed on Apr. 15, 2005, now Pat. No. 7,379,563.

(60) Provisional application No. 60/562,326, filed on Apr. 15, 2004.

(51) Int. Cl.
*G06K 9/00* (2006.01)

(52) U.S. Cl.
USPC .......................................... 382/103; 348/169

(58) Field of Classification Search
USPC .......... 382/103, 106, 107; 348/169; 715/863
See application file for complete search history.

(56) References Cited

U.S. PATENT DOCUMENTS

| | | | |
|---|---|---|---|
| 4,746,770 A | 5/1988 | McAvinney | |
| 5,164,992 A | 11/1992 | Turk et al. | |
| 5,454,043 A | 9/1995 | Freeman | |
| 5,483,261 A | 1/1996 | Yasutake | |
| 5,528,263 A | 6/1996 | Platzker et al. | |
| 5,534,917 A | 7/1996 | MacDougall | |
| 5,710,833 A | 1/1998 | Moghaddam et al. | |

(Continued)

FOREIGN PATENT DOCUMENTS

| | | |
|---|---|---|
| WO | WO 2004044823 A2 | 5/2004 |
| WO | WO 2005029722 A1 | 3/2005 |

OTHER PUBLICATIONS

Black, Michael J., et al., "EigenTracking: Robust Matching and Tracking of Articulated Objects Using a View-Based Representation", Springer-Verlay (1996), pp. 1-14.

(Continued)

*Primary Examiner* — Brian Le
(74) *Attorney, Agent, or Firm* — Kilpatrick Townsend & Stockton LLP

(57) ABSTRACT

Hands may be tracked before, during, and after occlusion, and a gesture may be recognized. Movement of two occluded hands may be tracked as a unit during an occlusion period. A type of synchronization characterizing the two occluded hands during the occlusion period may be determined based on the tracked movement of the occluded hands. Based on the determined type of synchronization, it may be determined whether directions of travel for each of the two occluded hands change during the occlusion period. Implementations may determine that a first hand and a second hand are occluded during an occlusion period, the first hand having come from a first direction and the second hand having come from a second direction. The first hand may be distinguished from the second hand after the occlusion period based on a determined type of synchronization characterizing the two hands, and a behavior of the two hands.

20 Claims, 13 Drawing Sheets

(56) References Cited

U.S. PATENT DOCUMENTS

| | | | |
|---|---|---|---|
| 5,818,421 A | 10/1998 | Ogino et al. | |
| 5,982,352 A | 11/1999 | Pryor | |
| 6,008,800 A | 12/1999 | Pryor | |
| 6,100,538 A | 8/2000 | Ogawa | |
| 6,147,678 A * | 11/2000 | Kumar et al. | 345/158 |
| 6,204,852 B1 * | 3/2001 | Kumar et al. | 345/419 |
| 6,215,890 B1 * | 4/2001 | Matsuo et al. | 382/103 |
| 6,275,214 B1 | 8/2001 | Hansen | |
| 6,434,255 B1 | 8/2002 | Harakawa | |
| 6,526,156 B1 | 2/2003 | Black et al. | |
| 6,720,949 B1 | 4/2004 | Pryor et al. | |
| 6,760,009 B2 | 7/2004 | Omura et al. | |
| 6,762,747 B2 | 7/2004 | Fujioka et al. | |
| 6,791,531 B1 | 9/2004 | Johnston et al. | |
| 6,803,906 B1 | 10/2004 | Morrison et al. | |
| 6,819,782 B1 | 11/2004 | Imagawa et al. | |
| 6,977,643 B2 | 12/2005 | Wilbrink et al. | |
| 7,058,204 B2 | 6/2006 | Hildreth et al. | |
| 7,170,492 B2 | 1/2007 | Bell | |
| 7,227,526 B2 | 6/2007 | Hildreth et al. | |
| 7,379,563 B2 | 5/2008 | Shamaie | |
| 8,259,996 B2 | 9/2012 | Shamaie | |
| 2002/0186221 A1 | 12/2002 | Bell | |
| 2003/0004678 A1 | 1/2003 | Zhang et al. | |
| 2004/0183775 A1 | 9/2004 | Bell | |
| 2004/0207600 A1 | 10/2004 | Zhang et al. | |
| 2005/0088407 A1 | 4/2005 | Bell et al. | |
| 2005/0089194 A1 | 4/2005 | Bell | |
| 2005/0110964 A1 | 5/2005 | Bell et al. | |
| 2005/0122308 A1 | 6/2005 | Bell et al. | |
| 2005/0162381 A1 | 7/2005 | Bell et al. | |
| 2006/0007170 A1 | 1/2006 | Wilson et al. | |
| 2006/0008149 A1 | 1/2006 | Tu et al. | |
| 2006/0139314 A1 | 6/2006 | Bell | |

OTHER PUBLICATIONS

Bowden, Richard, et al., "Building Temporal Models for Gesture Recognition", British Machine Vision Conference (2000), 10 pages.

Brand, Matthew, et al., "Coupled Hidden Markov Models for Complex Action Recognition", 1997 IEEE Computer Society Conference on Computer Vision and Pattern Recognition (1997), 6 pages.

Brennan, Vic, et. al. "Multiresolution using Principal Components Analysis", 2000 IEEE International Conference Acoustics, Speech, and Signal Processing (2000), 4 pages.

Brown Robert Grover, et al., "Introduction to Random Signals and Applied Kalman Filtering, with Matlab Exercises and Solutions," Third Edition, John Wiley & Sons, USA, (1997), pp. 214-252.

Bunke, Horst, "Recent Developments in Graph Matching," 15th International Conference on Pattern Recognition, (2000), 8 pages.

Campbell, Lee, et al., "Recognition of Human Body Motion Using Phase Space Constraints", M.I.T. Media Laboratory Perceptual Computing Section Technical Report No. 309, (1995), pp. 1-13.

Chen J et al.,"Visual modeling and evaluation of surgical skill", Springer-Verlag London Limited, 2003, pp. 1-11.

Chui C.K., et al., "Kalman Filtering with Real-Time Applications", Third Edition, Springer-Verlag, Berlin Heidelberg, (1999), pp. 1-67.

Communication pursuant to Article 94(3) EPC for European Application No. 06717487.0, mailed Jan. 28, 2011, 5 pages.

Coogan et al, Real Time Hand Gesture Recognition Including Hand Segmentation and Tracking, Advances in Visual Computing Lecture Notes in Computer Science, Berlin, DE, Jan. 1, 2006, pp. 495-504.

Cootes T. F., et al., "Training Models of Shape from Sets of Examples", British Machine Vision Conference (1992), 10 pages.

Co-pending U.S. Appl. No. 60/296,189, filed Jun. 5, 2005.
Co-pending U.S. Appl. No. 60/433,158, filed Dec. 13, 2003.
Co-pending U.S. Appl. No. 60/504,375, filed Sep. 18, 2003.
Co-pending U.S. Appl. No. 60/514,024, filed Oct. 24, 2003.
Co-pending U.S. Appl. No. 60/514,232, filed Oct. 24, 2003.
Co-pending U.S. Appl. No. 60/528,439, filed Dec. 9, 2003.
Co-pending U.S. Appl. No. 60/554,520, filed Mar. 18, 2004.
Co-pending U.S. Appl. No. 60/599,399, filed Aug. 6, 2004.

Cowell Robert G., et al., "Probabilistic Networks and Expert Systems," Springer-Verlag, New York, (1999), pp. 1-41.

Davis, James, et al., "Toward 3-D Gesture Recognition" International Journal of Pattern Recognition and Artificial Intelligence, vol. 13, No. 3 (1999), 16 pages.

Diedrichsen, J., et al., "Moving to Directly Cued Locations Abolishes Spatial Interference During Bimanual Actions," Psychological Science, vol. 12 No. 6, Nov. 2001, pp. 493-498.

Dockstader, et al., "Tracking Multiple Objects in the Presence of Articulated and Occluded Motion," Workshop on Human Motion, 2000, pp. 88-95.

Donchin O et al., "Primary Motor Cortex is Involved in Bimanual Coordination", Nature: vol. 395, Sep. 17, 1998, pp. 274-278.

Edwards Jeff, et al., "Appearance Matching of Occluded Objects Using Coarse-to-Fine Adaptive Masks," Proceedings from Conference Computer Vision and Pattern Recognition, CVPR'97, Puerto Rico, (1997), pp. 533-539.

Eisenstein J et al., "Analysis of Clustering Techniques to Detect Hand Signs," International Symposium on Intelligent Multimedia, Video, and Speech Processing (2001), 4 pages.

Erenshteyn, Roman, et al., Distributed Output Encoding for Multi-Class Pattern Recognition, 10th IEEE International Conference on Image Analysis and Processing, Venice, (Sep. 1999), 6 pages.

Fine, Shai, et al., "The Hierarchical Hidden Markov Model: Analysis and Applications," Machine Learning, vol. 32, No. 1 (Jul. 1998) pp. 1-23.

Fukushima, Kunihiko, "Recognition of Occluded Patterns: A Neural Network Model," Proceedings from IEEE International Joint Conference on Neural Networks, IJCNN '00, (2000), pp. 135-138.

Georghiades et al., "From Few to Many: Illumination Cone Models for Face Recognition under Variable Lighting and Pose", IEEE Transactions on Pattern Analysis and Machine Intelligence, Vol. 23, No. 6, pp. 643-660 (Jun. 2001).

Ghahramani, Zoubin, "An Introduction to Hidden Markov Models and Bayersian Networks", International Journal of Pattern Recognition and Artificial Intelligence, 15(1): 9-42, (2001), 25 pages.

Gong, Shaogang, et al., "On the Semantics of Visual Behavior, Structured Events and Trajectories of Human Action", Image and vision Computing 20 (2002), pp. 873-888.

Habili et al., "Hand and Face Segmentation Using Motion and Color Cues in Digital Image Sequences", IEEE . International Conference on Multimedia & Expo 2001, Tokyo, Japan, (2001) 11 pages.

Harris, Christopher M., et al., "Signal-dependent noise determines motor planning," Nature: vol. 394, Aug. 20, 1998, pp. 780-784.

Hauck, et al., "Hierarchical recognition of Articulated Objects from Single Perspective Views," 1997 IEEE Computer Society Conference on Computer Vision and Pattern Recognition (1997), 7 pages.

Heap, Tony, et al., "Improving Specificity in PDMs using a Hierarchical Approach," British Machine Vision Conference (1997), pp. 1-10.

Heckerman, David, "A Tutorial on Learning With Bayesian Networks," Nov. 1996, Technical Report MSR-TR-95-06, Microsoft Research Advanced Technology Division, 58 pages.

Heidemann, Gunther, et al., "A System for Various Visual Classification Tasks Based on Neural Networks," Proceedings from International Conference Pattern Recognition, Barcelona, (2000), pp. 9-12.

Heidemann Gunther, et al., "Segmentation of Partially Occluded Objects by Local Classification," Proceedings from International Joint Conference Neural Networks, IIJCNN'2000, Como, Italy, (2000), pp. 152-157.

Hill, Andrew, et al., "A Framework for Automatic Landmark Identification Using a New Method of Nonrigid Correspondence", IEEE Transactions on Pattern Analysis and Machine Intelligence, vol. 22, No. 3 (Mar. 2000), pp. 241-251.

Huang, Chung-Lin, et al., "Recognition Using the Multi-PDM Method and Hidden Markov Models," Institute of Electrical Engineering, Vision Interface '99, Trois-Rivieres, Canada, May 19-21, 1999, pp. 468-474.

International Search Report, Application Serial No. PCT/US05/13033, dated Apr. 10, 2007, 9 pages.

Intille, Stephen J., et al., "Disparity-Space Images and Large Occlusion Stereo", M.I.T. Media Lab Perceptual Computing Group Technical Report No. 220 Condensed version appears in ECCV '94 proceedings, Stockholm, Sweden (1994), pp. 1-12.
Isard, Michael, et al., "A Smoothing Filter for Condensation," University of Oxford, Oxford OX1 3PJ, UK (1998),15 pages.
Isard, Michael, et al., "Condensation-Conditional Density Propagation for Visual Tracking", Department of Engineering Science, University of Oxford, Oxford OX1 3PJ, UK Int. J. Computer Vision (1998), pp. 1-36.
Ishibuchi, Koichi, et al., "Real Time Hand Gesture Recognition using 3D Prediction Model," ATR Communications System Research Laboratories, International Conference Systems, Man, and Cybernetics (1993), 6 pages.
Jackson, G.M., et al., "The coordination of bimanual prehension movements in a centrally deafferented patient," Brain (2000), 123, pp. 380-393 (Oxford University Press 2000), 14 pages.
Jain, et al., "Statistical Pattern Recognition: A Review," IEEE Transactions on Pattern Analysis and Machine Intelligence, vol. 22, No. 1, Jan. 2000, 34 pages.
Jelinek Frederick, "Statistical Methods for Speech Recognition", The MIT Press, Cambridge, Massachusetts, (1997), (pp. 1-37).
Jojic, Nebojsa, et al., "Tracking Self-Occluding Articulated Objects in Dense Disparity Maps", IEEE International Conference on Computer Vision, Corfu, Greece, Sep. 1999, 8 pages.
Jolliffe I.T., "Chapter 1. Introduction" and "Chapter 2. Mathematical and Statistical Properties of Population Principal Components", Principal Component Analysis, Springer Series in Statistics, Springer-Verlag, 1986, pp. 29.
Kennerley, Steven W., et al., "Callosotomy Patients Exhibit Temporal Uncoupling During Continuous Bimanual Movements", Nature Neuroscience, Published online . Mar. 4, 2002, DOI: 10.1038/nn822, 6 pages.
Kohler M. R. J., "System Architecture and Techniques for Gesture Recognition in Unconstraint Environments", Proceedings of the 1997 International Conference on Virtual Systems and Multimedia (1997), 10 pages.
Lamar, Marcus V., et al., "Hand Gesture Recognition Using Morphological Principal Component Analysis and an Improved CombNET-II", Proceedings from IEEE International Conference System, Man, and Cybernetics, Tokyo, (Oct. 1999), pp. 57-62.
Lee Hyeon-Kyu et al., "An HMM-Based Threshold Model Approach for Gesture Recognition", IEEE Transactions on Pattern Analysis and Machine Intelligence, vol. 21, No. 10 (Oct. 1999), pp. 961-973.
Li, Yongmin, et al., "Recognising Trajectories of Facial Identities Using Kernel Discriminant Analysis," Department of Computer Science, Queen Mary, University of London, 10 pages (2001).
Lin, Daw-Tung, "Spatio-Temporal Hand Gesture Recognition Using Neural Networks", Proceedings from IEEE World Congress on Computational Intelligence, (1998), pp. 1794-1798.
Linde Yoseph, et al., "An Algorithm for Vector Quantizer Design," IEEE Transactions on Communications, vol. Com-28, No. 1, (Jan. 1980), pp. 84-95.
Lucas, et al., "An Iterative Image Registration Technique with an Application to Stereo Vision," From Proceedings of Imaging Understanding Workshop, pp. 121-129, 1981.
Lyons Michael J. et al., "Automatic Classification of Single Facial Images", IEEE Transactions on Pattern Analysis and Machine Intelligence, vol. 21, No. 12, (Dec. 1999), pp. 1357-1362.
MacLean, James, et al., "Fast Hand Gesture Recognition for Real-Time Teleconferencing Applications", Proceedings Second Workshop on Recognition, Analysis, and Tracking Gestures in Real-Time Systems, IEEE (2001), pp. 1-8.
Mammen, et al., "Simultaneous Tracing of Both Hands by Estimation of Erroneous Observations," Proceedings of the British Machine Vision conference, 2001, pp. 83-92.
Martinez, Aleix M, "PCA Versus LDA," IEEE Transactions on Pattern Analysis and Machine Intelligence, vol. 23, No. 2, (Feb. 2001), pp. 228-233.
Matsuthita, et al., "HoloWall: Designing a Finger, Hand, Body, and Object Sensitive Wall," Association of Computing Machinery (ACM), 1997, pp. 209-210.
McALLISTER, G., et al., "Hand tracking for behaviour understanding," Image and Vision Computing 20 (2002), pp. 827-840.

McKenna, Stephen J., et al., "Gesture Recognition for Visually Mediated Interaction using Probabilistic Event Trajectories", British Machine Vision Conference (1998), pp. 498-507.
Mechsner, F., "Perceptual basis of bimanual coordination," Nature, vol. 414, Nov. 2001, pp. 69-73.
Mechsner, F., "Why are we particularly good at performing symmetrical movements," Max-Planck Research 2002, 1 page.
Moghaddam, et al., "Beyond Eigenfaces: Probabilistic Matching for Face Recognition," MIT Media Laboratory Perceptual Computing Section Technical Report No. 443, (1998), pp. 1-6.
Moghaddam, et al., "Probabilistic Visual Learning for Object Detection," M.I.T. Media Laboratory Perceptual Computing Section Technical Report No. 326, (1995), pp. 1-8.
Moghaddam, "Principal Manifolds and Bayesian Subspaces for Visual recognition," Merl A Mitsubishi Electrical Research Laboratory, TR-99-35, Jul. 1999, 8 pages.
Morguet, Peter, et al., "Comparison of Approaches to Continuous Hand Gesture Recognition for a Visual Dialog System", Proc. of ICASSP 99 (1999), 4 pages.
Morrison, Kenny, et. al, "An Experimental Comparison of Trajectory-based and History-based Representation for Gesture Recognition", Division of Applied Computing, University of Dundee, (2003), reprint of paper to appear in 5th International Workshop on Gesture and Sign Language based human Computer Interaction (GW), Genoa, Italy, Apr. 2003, pp. 1-13.
Muller, et al., "An Introduction to Kernel-Based Learning Algorithms," IEEE Transactions on Neural Networks, vol. 12, No. 2, Mar. 2001, 21 pages.
Murphy, Kevin P., et al., "Loopy Belief Propagation for Approximate Inference: An Empirical Study", Proceedings of Uncertainty in AI (1999), 9 pages.
Nam, Yanghee, et al., "Recognition of Space-Time Hand-Gestures using Hidden Markov Model", ACM Symposium on Virtual Reality Software and Technology, Hong Kong (1996), 8 pages.
Ng, Chan Wah, et al., "Gesture Recognition via Pose Classification", Proceedings from International Conference on Pattern Recognition ICPR'00, Barcelona, (2000), pp. 699-704.
Office Action from U.S. Appl. No. 12/461,366, dated Feb. 3, 2011, 6 pages.
Pavlovic, et al., "Visual Interpretation of Hand Gestures for Human-Computer Interaction: A Review," IEEE Transactions on Pattern Analysis and Machine Intelligence, vol. 19, No. 7, Jul. 1997,pp. 36.
Pearl, J. "Probabilistic Reasoning in Intelligent Systems: Networks of Plausible Inference", San Mateo, CA: Morgan Kaufmann, 1988. 143.
Pentland, "Looking at People: Sensing for Ubiquitous and Wearable Computing," IEEE Transactions on Pattern Analysis and Machine Intelligence, vol. 22, No. 1, Jan. 2000, pp. 107-119.
Pitas, Ioannis "Chapter 6. Image Segmentation Algorithms", Digital Image Processing Algorithms Prentice Hall International Series in Acoustics, Speech and Signal Processing, 1993, pp. 254-297.
Regh, et al, "Model-Based Tracking of Self-Occluding Articulated Objects," Proceedings of the Fifth International Conference on Computer Vision, 1995, pp. 612-617.
Rivlin, Ze'ev, et al., "A Phone-Dependent Confidence Measure for Utterance Rejection" Speech Technology and Research Laboratory (1996), 4 pages.
Ron, Dana, et al., "The Power of Amnesia: Learning Probabilistic Automata with Variable Memory Length," Machine Learning, Springer Netherlands (1996), pp. 1-31.
Schlenzig Jennifer, et al., "Recursive Identification of Gesture Inputs Using Hidden Markov Models", Proc. 2' d IEEE Workshop on Applications of Computer vision, Sarasota, (Dec. 1994), pp. 187-194.
Scholkopf, Bernard, et al., "Kernel PCA Pattern Reconstruction via Approximate Pre-Images," (1998), Proceedings of the 8th International Conference on Artificial Neural Networks, 6 pages.
Scholkopf, Bernard, et al., "Nonlinear Component Analysis as a Kernel Eigenvalue Problem," Technical Report No. 44, Dec. 1996, pp. 1-18.
Sejnowski, Terrence J., "Making Smooth Moves," Nature: vol. 394, Aug. 20, 1998, pp. 725-726.

Shamaie et al., "A Dynamic Model for Real Time Tracking of Hands in Birnanual Movement," Gesture-Based Communication in Human-Computer Interaction, Springer-sVeriag, BedialHeidelberg, Feb. 6, 2004, 172-179.

Shamaie, et al., "A Dynamic Model for Real-Time Tracking of Hands in Bimanual Movements", In Proceedings of Gesture Workshop, 2003, pp. 172-179.

Shamaie, et al., "A New Transformation Technique for Accurate Estimation of Partly-Occluded Ellipse Parameters," Scientia Iranica, vol. 6, No. 1, Sharif University of Technology, Jan. 1999, pp. 43-50.

Shamaie, et al., "Accurate Estimation of Partly-Occluded Ellipse Parameters," Fifth Iranian Conference on Electrical Engineering, May 7-9, 1997, Department of Electrical and Computer Engineering, University of Tehran, Tehran, Iran, 14399, 11 pages.

Shamaie, et al., "Accurate recognition of large number of hand gestures", 2nd Iranian Conference on Machine Vision and Image Processing, pp. 1-10, Feb. 2003.

Shamaie et al., "Bayesian Fusion of Hidden Markov Models for Understanding Bimanual", Automatic Face and Gesture Recognition, 2004. Proceedings. Sixth IEEE International Conference on, May 2004, pp. 602-607.

Shamaie, et al., "Graph-based matching of occluded hand gestures", IEEE Applied Imagery Pattern Recognition Workshop, Oct. 2001, pp. 67-73.

Shamaie et al., "Hand Trackino in Bimanual Movements", Image and Vision Computing, Elsevier Guildfor, GB, Nov. 29, 2005, vol. 23, No. 13, pp. 1131-1149.

Sherrah Jamie, et al., "Resolving Visual Uncertainty and Occlusion through Probabilistic Reasoning", Proceedings from British Machine Vision Conference, BMVC 2000, Bristol, (Sep. 2000) 10 pages.

Sozou P.D. et al., "A Non-linear Generalisation of PDMs using Polynomial Regression", British Machine Vision Conference (1994), 11 pages.

Sozou P.D. et al., "Non-linear Point Distribution Modelling using a Multi-layer Perceptron", British Machine Vision Conference 1995 (1995), 22 pages.

Starner, Thad, et. al, "Real-Time American Sign Language Recognition from Video Using Hidden Markov Models", M.I.T. Media Laboratory Perceptual Computing Section Technical Report No. 375, (1995), pp. 1-7.

Starner, Thad, et al., "Real-Time American Sign Language Recognition Using Desk and Wearable Computer Based Video," M.I.T. Media Laboratory Perceptual Computing Section Technical Report No. 466 (1996), pp. 1-7.

Starner, Thad, et al., "Visual Recognition of American Sign Language Using Hidden Markov Models," Perceptual Computing Section, The Media Laboratory, Massachusetts Institute of Technology, (1995), 6 pages.

Stauffer, Chris, "Automatic Hierarchical Classification Using Time-Based Co-Occurrences," IEEE Conference Computer Vision and Pattern Recognition, CVPR'99, Fort Collins, Colorado, (Jun. 1999), pp. 333-339.

Su et al., "Application of Neural Networks in Spatio-temporal Hand Gesture Recognition", Proceedings from IEEE World Congress on Computation Intelligence, (1998), pp. 2116-2121.

Supplementary European Search Report—EP05733722—Search Authority—Munich—May 18, 2011.

Theodoridis Sergios, et al., "Pattern Recognition", Second Edition, Elsevier Academic Press, London, (2003), pp. 13-55.

Weiss, Yair, "Belief Propagation and Revision in Networks with Loops," A. I. Memo No. 1616, C.B.C.I., Paper No. 155, Nov. 1997, 15 pages.

Weiss, Yair, "Correctness of Local Probability Propagation in Graphical Models with Loops," Neural Computation 12, (2000), pp. 1-41.

Weiss, Yair, et al., "Correctness of Belief Propagation in Gaussian Graphical Models of Arbitrary Topology,"(1994), 25 pages.

Wilson, et al., "Parametric Hidden Markov Models for Gesture Recognition," IEEE Transactions on Pattern Analysis and Machine Intelligence, vol. 21, No. 9, Sep. 1999, pp. 884-900.

Wilson, et al., "Using Configuration States for the Representation and Recognition of Gesture," M.I.T. Laboratory Perceptual Computing Section Technical Report No. 308 (1995), pp. 1-11.

Wolpert, Daniel M., et al., "Perspectives and Problems in Motor Learning," Trends in Cognitive Science, vol. 5, No. 11, (Nov. 2001), pp. 487-494.

Written Opinion—PCT/US2005/013033—ISA/EPO—Apr. 10, 2007.

Yanez-Suarez, Oscar, "Unsupervised Clustering in Hough Space for Identification of Partially Occluded Objects", IEEE Transactions on Pattern Analysis and Machine Intelligence, vol. 21, No. 9, (Sep. 1999), pp. 946-950.

Ying, Zhengrong, et al., "Statistical Model for Occluded Object Recognition," Proceedings from IEEE International Conference Information, Intelligence and Systems, Bethesda, MD (Nov. 1999), 4 pages.

Zhou, et al., "A Bayesian Framework for Real-Time 3D Hand Tracking in High Clutter Background," 10th International Conference on Human-Computer Interaction, Crete, Greece, 2003.

Zieren Jorg et al., "Hands Tracking from Frontal View for Vision-Based Gesture Recognition", Lecture Notes in Computer Science LNCS 2449 Springer, (2002), 8 pages.

* cited by examiner

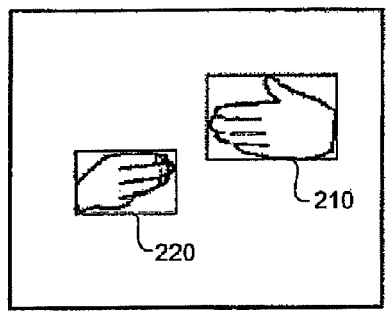
FIG. 2
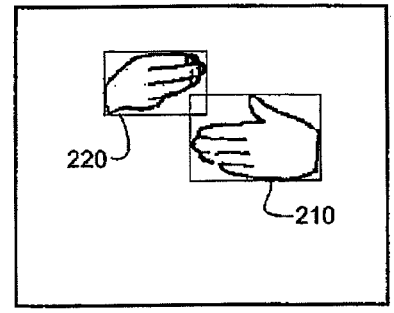
FIG. 3
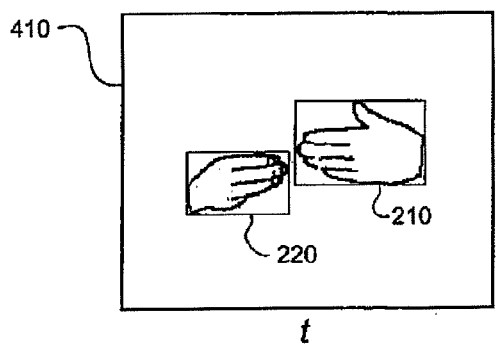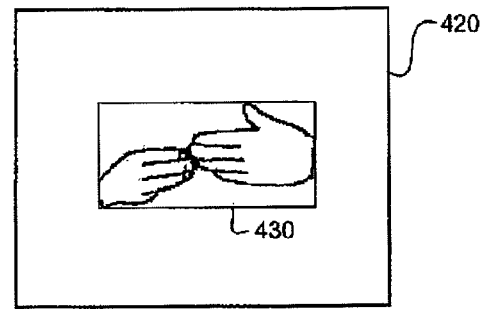
FIG. 4
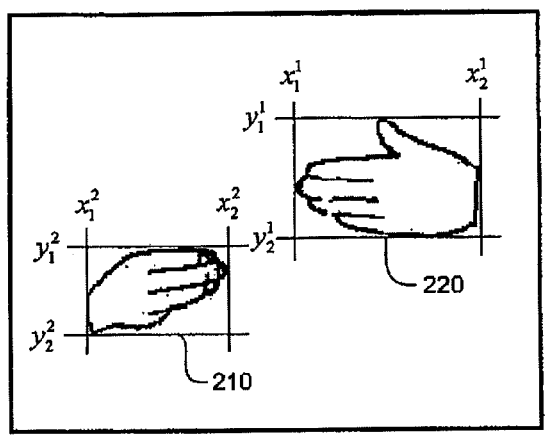
FIG. 5

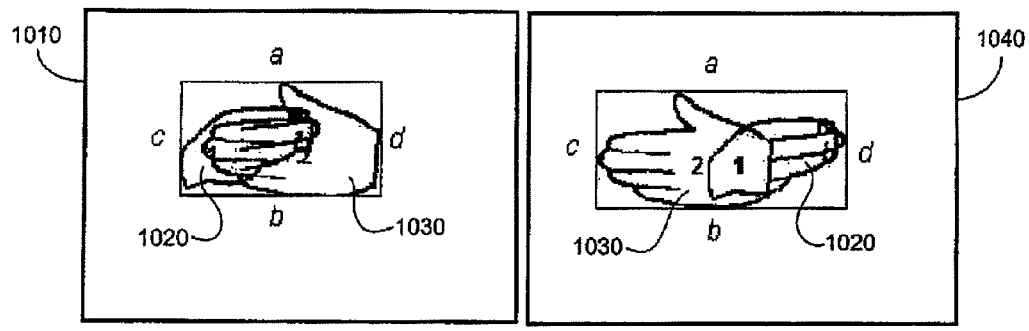
FIG. 10
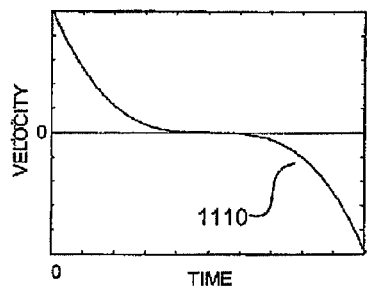 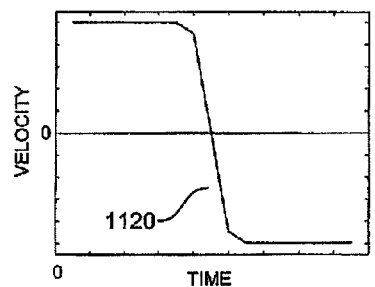
FIG. 11(a)  FIG. 11(b)
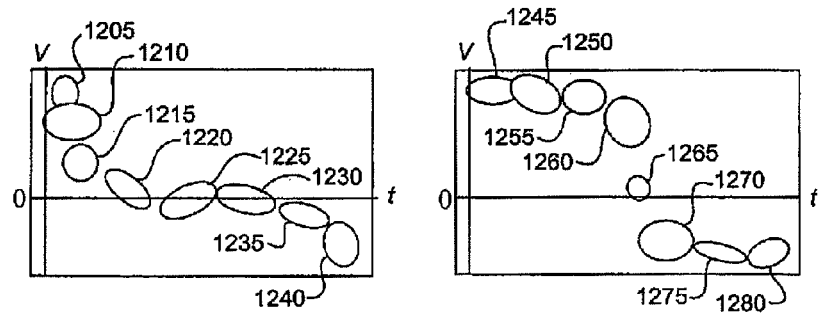
FIG. 12(a)  FIG. 12(b)

TRACKING BIMANUAL MOVEMENTS

RELATED APPLICATION

The present application is a continuation of U.S. Non-Provisional application Ser. No. 11/932,766, filed Oct. 31, 2007, and titled "Tracking Bimanual Movements", which is a continuation of U.S. Non-Provisional application Ser. No. 11/106,729, filed Apr. 15, 2005, now U.S. Pat. No. 7,379,563, issued May 27, 2008, and titled "Tracking Bimanual Movements" which claims priority from U.S. provisional application No. 60/562,326, filed Apr. 15, 2004, and titled "Real-Time Handtracking During Bimanual Movements," the entire contents of these related applications are incorporated herein by reference.

TECHNICAL FIELD

This invention relates to data processing.

BACKGROUND

Interacting with computers is not limited to mouse and keyboard. Sensing the movement of a person to recognize his/her gesture is the subject of a wide spectrum of research in Human Computer Interaction and Computer Vision. Recognizing human hand gestures in particular provides computers with a natural method of communication. Applications from medical to surveillance and security may use the technology described herein. Learning and recognizing hand movements are significant components of such technologies.

Bimanual movements in general form a large subset of hand movements in which both hands move simultaneously in order to do a task or imply a meaning. Clapping, opening a bottle, typing on a keyboard and drumming are some common bimanual movements. Sign Languages also use bimanual movements to accommodate sets of gestures for communication.

Typically, a prerequisite to recognition of hand movements is tracking. Objects may be tracked using stereo imaging.

Two common techniques used in tracking are Kalman filtering and Particle filtering. Particle filtering may be used for tracking and resolving occlusion problems. Other tracking algorithms may use techniques such as, for example, Bayesian Networks, object model matching based on probabilistic tracking functions, minimization of cost functions, and analytic model matching. Several tracking algorithms include non-linear optimizations.

SUMMARY

One or more described implementations allow two hands to be tracked before an occlusion, the occlusion to be identified as such, and the separate hands to be reacquired and tracked after the occlusion. The tracking is independent of camera view, of hand shape, and of a changing hand shape such as occurs, for example, when fingers are moving. Additionally, a gesture being performed by the hands may be recognized, including portions of the gesture being performed before, during, and after the occlusion.

One or more tracking algorithms are able to deal with occlusions in real-time, to track non-rigid objects such as human hands, and are tolerant of changes caused by moving the position of a camera. In particular, when a hand is occluded by another hand, one or more described systems is able to reacquire the hands when occlusion ends, and can do so without requiring the hands to be wearing different color gloves.

One or more disclosed systems handles the variability of an object's shape due to the object's non-rigid nature. Such a system does not necessarily lose its tracking clue when the shape of the object changes quickly.

One or more disclosed systems use a tracking algorithm that is independent of the camera view direction. Therefore, a change in the view direction may be tolerated by the algorithm. An interesting application of this is tracking hands while the camera moves. Dynamic changes in camera position are often inevitable in active vision applications such as mobile robots.

After tracking the hands in a sequence of images various disclosed systems recognize the gesture. Neural Networks are used for recognition in one or more systems, as are Bayesian Networks and in particular Hidden Markov Models (HMM).

One or more disclosed implementations uses a recognition technique that tolerates hand-hand occlusion. During a bimanual movement one hand may cover the other hand partially or completely.

One or more disclosed implementations uses a recognition technique that tolerates a hand temporarily moving out of the region of interest. In such a case, two hands are not present over the whole period of a bimanual gesture. A disclosed recognition technique also tolerates a hand being completely occluded by some other object like the body of person.

One or more implementations was a recognition technique that recognizes continuous (concatenated) periodic bimanual movements. A periodic bimanual movement like clapping so typically includes a short cycle of movement of two hands repeated several times. In many Virtual Reality applications, a few bimanual movements are concatenated in order to interact with the virtual environment, and these movements should be recognized and movement transitions should be detected.

In one or more implementations, a Cognitive System for tracking the hands of a person, resolving left hand and right hand in the presence of occlusion, and recognizing bimanual movements is presented. In a digitally presented scene, the two hands of a person are tracked by a novel tracking algorithm based on one or more neuroscience phenomena. When a gesture recognition algorithm recognizes the movement of each hand and combines the results in order to recognize the performed bimanual movement. The system may be useful in tracking and recognizing hand movements for interacting with computers, helping deaf people to communicate with others, and security applications.

According to a general aspect, movement is tracked of two occluded hands during an occlusion period, and the two occluded hands are tracked as a unit. A type of synchronization is determined that characterizes the two occluded hands during the occlusion period. The type of synchronization is based, at least in part, on the tracked movement of the two occluded hands. Based at least in part on the determined type of synchronization, it is determined whether directions of travel for each of the two occluded hands change during the occlusion period.

Implementations may include one or more of the following features. For example, determining whether directions change may be further based on the tracked movement of the two occluded hands. Determining whether directions change may include determining whether the two hands pass each other during the occlusion period, pause during the occlusion period, or collide with each other during the occlusion period.

Determining whether directions change may include determining whether each of the two hands go, after the occlusion period, to directions from which they came, or to directions opposite from which they came. The directions may include one or more of a vertical direction, a horizontal direction, and a diagonal direction.

Determining a type of synchronization may include determining whether the two hands are positively or negatively synchronized, and determining whether directions change may be further based on whether the two hands are negatively synchronized. Determining a type of synchronization may include determining a measure of the occluded hands' velocities. The measure may include a standard deviation of a difference of velocities of parallel sides of a rectangle formed to surround the occluded hands.

Tracking movement of the two occluded hands may include tracking movement of a rectangle formed to surround the occluded hands, and determining whether directions change may include determining a measure of the occluded hands' velocities based on velocities of one or more sides of the rectangle. Determining whether directions change may be based on whether the measure goes below a threshold. The measure may be a function of a square root of a sum of squares of velocities of parallel sides of the rectangle.

Determining whether directions change may be based on one or more probability distributions of the measure. The measure may be a function of a difference of velocities of parallel sides of the rectangle. The one or more probability distributions may include a first set of distributions associated with a first velocity pattern and a second set of distributions associated with a second velocity pattern. The first velocity pattern may be indicative of the two hands passing each other during the occlusion period, and the second velocity pattern may be indicative of the two hands not passing each other during the occlusion period.

Determining whether directions change may further include determining a first and a second probability, and comparing the first probability with the second probability. The first probability may be based on the first set of distributions, and be the probability that the first velocity pattern produced the measure of the occluded hands' velocities. The second probability may be based on the second set of distributions, and be the probability that the second velocity pattern produced the measure of the occluded hands' velocities. Based on a result obtained during the comparing, it may be determined whether the two occluded hands passed each other during the occlusion period.

According to another general aspect, it is determined that a first hand and a second hand are occluded, the first hand having come from a first direction and the second hand having come from a second direction. The movement of the occluded hands is tracked as a unit. A type of synchronization is determined that characterizes the occluded hands. The type of synchronization is determined, at least in part, based on the tracked movement of the occluded hands. It is determined that the first hand and the second hand are no longer occluded and, after this determination, the first hand is distinguished from the second hand based at least in part on the determined type of synchronization.

The aspects, features, and implementations may be implemented as, for example, a method, a device including instructions for carrying out a method, a device otherwise configured to carry out a method, and a system including any of such devices. The details of one or more implementations are set forth in the accompanying drawings and the description below. Other features will be apparent from the description and drawings, and from the claims.

DESCRIPTION OF DRAWINGS

FIG. 2 shows a rectangle around each of two hands.

FIG. 3 shows the rectangles of FIG. 2 overlapping with no hand-hand occlusion.

FIG. 4 shows a progression of movement of the rectangles of FIG. 2 creating a hand-hand occlusion.

FIG. 5 shows the rectangles of FIG. 2 modeled by their sides.

FIG. 10 shows a progression of images in which the vertical sides of the occlusion-rectangle are pushed back because hands pass each other and push the vertical sides in opposite directions.

FIGS. 11(a)-(b) illustrate the velocity changes for movements in which hands (a) pause/collide and return, or (b) pass each other.

FIGS. 12(a)-(b) illustrate sequences of Gaussian distributions to model an occlusion-rectangle sides' velocities during the two categories of (a) hand-pause, and (b) hand-pass.

DETAILED DESCRIPTION

Figure 1A:
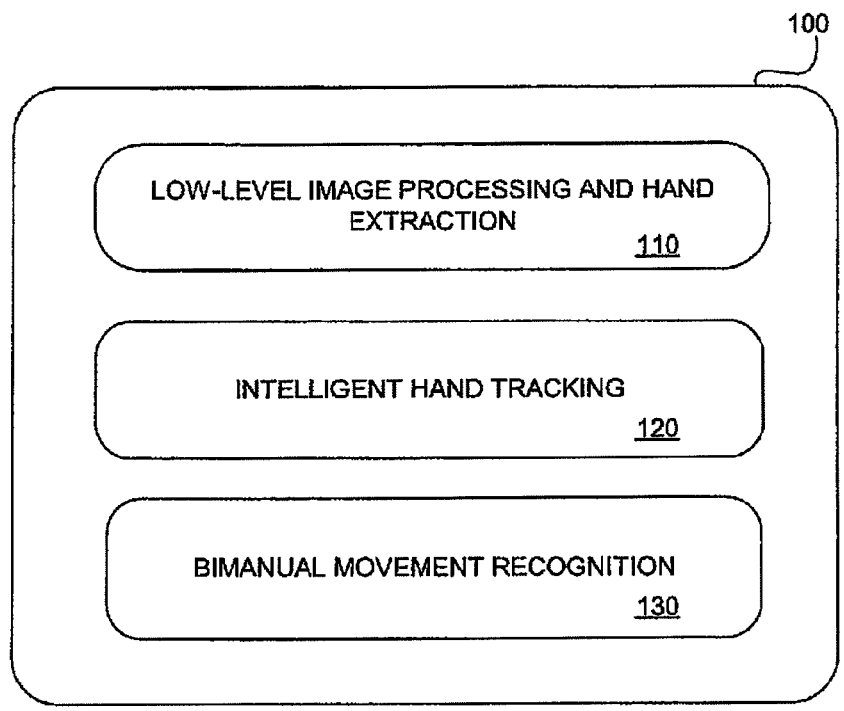
FIGS. 1(a)-(b) shows three main components of a particular system and a hierarchy for recognizing bimanual movements.

Referring to FIG. 1(a), one or more disclosed implementations includes a cognitive system 100 for learning and understanding bimanual movements that entails three fundamental components: low-level processing 110 to deal with sensory data, intelligent hand tracking 120 to recognize the left hand from the right hand, and bimanual movement recognition 130 for recognizing the movements.

At the low-level image processing 110, the hands are to be extracted from the images. Using, for example, skin color detection in color images or grey-level detection in high contrast black and white images, the hands are extracted from the background.

The second component 120 includes hand tracking, which may be complicated by hand-hand occlusion. When one hand covers the other hand partially or completely, the two hands should be reacquired correctly at the end of occlusion. Various disclosed implementations exploit one or more neuroscience phenomena for the reacquiring process.

Particular studies in neuroscience show that the two hands are temporally and spatially coordinated in bimanual movements. In addition, the components of a hand also are temporally coordinated. This temporal and/or spatial coordination can form the basis of an algorithm for tracking and reacquiring hands when hand-hand occlusion occurs. In general, the coordination causes the two hands to start, pause, and end their movements simultaneously. Also, hand velocities during a bimanual movement are often highly synchronized. This velocity coordination, for example, may be a source of difficulty for beginners learning to play the piano with two hands.

An implementation uses a Kalman filtering based technique to monitor hands' velocities, to detect pauses and to recognize synchronization between the hands. By detecting the synchronization and pauses, particularly during a hand-hand occlusion period, the tracking algorithm of an implementation recognizes the right hand from the left hand when occlusion ends.

The tracking algorithm of one implementation is also used for segmenting a bimanual movement. By segmentation, each part of the movement receives a label that indicates whether the part is an occlusion or non-occlusion segment. A non-occlusion category may include three different segments, namely beginning, middle, and ending segments. Therefore, the tracking algorithm of the implementation divides a bimanual movement into up to four different segments depending on the nature of the movement.

In one implementation, the tracking algorithm takes a general view of the tracking problem. For example, from a pure pattern recognition point of view, a movement can be recognized differently when it is seen from different viewing directions. A general set of movement models that are generally independent of view direction are defined so that a model can be found for a bimanual movement when it is seen from different viewing angles.

The use of bimanual synchronization may also make the tracking algorithm of one or more described implementations independent of the hand shapes. Independence of hand shape and view direction may make a tracking algorithm useful in mobile vision applications (e.g., Active Vision in Robotics).

The tracking algorithm of one implementation contains a model that is independent of the actual positions and velocities of the hands. Consequently, this tracking algorithm can be used in applications where the visual system moves or turns. For instance, assuming that a camera is installed on a mobile robot, the tracker can track the hands of a subject while the robot moves.

Figure 1B:
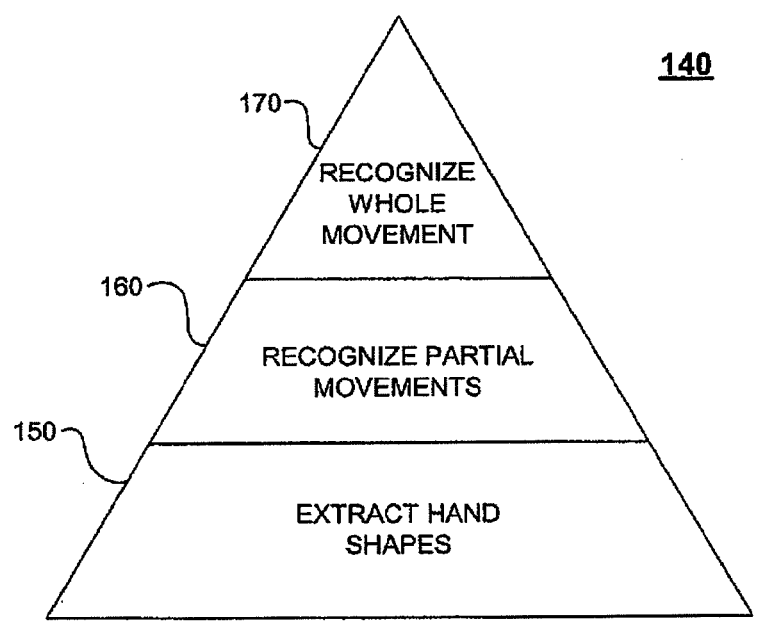

The third component 130 includes gesture recognition, and, referring to FIG. 1(b), may be represented by a hierarchical cognitive system 140. System 140 analyzes hand shapes at a bottom level 150, which may use image analysis and pattern recognition for hand shape extraction and detection. System 140 learns the individual partial movement of each hand at an intermediate level 160, using, for example, spatio-temporal single-hand gesture recognition. System 140 combines the partial movements at a top level 170 to recognize the whole movement.

Statistical and spatio-temporal pattern recognition methods such as Principal Component Analysis and Hidden Markov Models may be used in the bottom 150 and intermediate 160 levels of the system 140. A Bayesian inference network at the top level may perceive the movements as a combination of a set of recognized partial hand movements. A bimanual movement may be divided into individual movements of the two hands. Given that the hands may partially or completely occlude each other or a hand can disappear due to occlusion by another object, the fusion network at the bottom level may be designed to be able to deal with these cases. The occlusion and non-occlusion parts of a movement, which are treated as different segments, may be recognized separately. Individual Hidden Markov Models at the intermediate level may be assigned to the segments of the gestures of the hands. Using these HMMs, partial movements are recognized at the intermediate level. In order to recognize the partial movements, in one implementation, the hand shapes and the movement of each hand in each frame of a given image sequence are recognized and labeled. The recognition and labeling may be done at the bottom level of the hierarchy using Principal Component Analysis and motion vector analysis.

In one implementation, system 140 has been developed so that it learns single movements and recognizes both single and continuous (concatenated) periodic bimanual movements. As mentioned earlier, recognizing continuous movements may be particularly useful in interacting with a virtual environment through virtual reality and immersive technologies.

Recognition of hand gestures may be more realistic when both hands are tracked and any overlapping is taken into account. In bimanual movements the gestures of both hands together typically make a single gesture. Movement of one hand in front of the other is one source of occlusion in bimanual movements. Also, for the bimanual movements where there is no occlusion in the essence of the movement, changing the view direction of the camera can cause one hand to be occluded by the other occasionally.

By using pixel grey-level detection, hands from a dark background may be extracted. In an extracted image, only the pixels with a non-zero value can belong to the hands. The Grassfire algorithm may be used in order to extract the hands. Grassfire may be described as a region-labelling or blob-analysis algorithm, and the Grassfire algorithm may scan an image from left to right, top to bottom to find the pixels of connected regions with values belonging to the range of the hands' grey-level. For the first pixel found in that range the algorithm turns around the pixel to find other pixels. The algorithm attempts to find all the connected regions and label them.

In order to track hands, we detect occlusion. Two types of occlusion are considered here. First, the case where one hand occludes the other, which we call hand-hand occlusion. Second, the case in which something else occludes a hand or the hand bides behind another object, e.g., the body, partially or completely. When one hand occludes the other, we detect the beginning point of occlusion, and are able to separate the hand-hand occlusion from the other type of occlusion. For this we introduce the following model.

Referring to FIG. 2, a rectangle 210, 220 is constructed around each hand in an image. The sides of a rectangle represent the top, bottom, left, and right edges of the corresponding hand's blob. Therefore, by moving a hand its rectangle moves in the same way. By tracking these rectangles we detect the start and end points of a hand-hand occlusion. To detect the beginning point we look at the movement of the rectangles. If at some stage there is any intersection between the rectangles it could be recognized as occlusion. However, referring to FIG. 3, in some cases there might be an intersection of the rectangles with no occlusion. Also, referring to FIG. 4, if we suppose that at time t in a window 410 there is no intersection of the rectangles 210 and 220, and at time t+1 in a window 420 occlusion happens, there is only one big blob and one rectangle 430 is constructed around the one blob. It happens because the hand shapes are connected together and the Grassfire algorithm extracts the connected region of the hands as a single blob. Hand-hand occlusion, versus other occlusion, is not necessarily distinguishable because hand-hand occlusion can be similar to a hand's movement out of a region of interest or hiding behind a part of a body. To address this problem, we use a model to predict the future movement of each hand.

We use a dynamic model based on Kinematics equations of motion and Kalman filtering to track the movements and predict the future position of the rectangles. By this, we may be able to predict a possible intersection of the rectangles a few steps in advance, and provide an alarm of a probable hand-hand occlusion.

A general Kalman filter can be explained, in part, by the following equations, $$x_{k+1} = \Phi_k x_k + w_k \quad (1)$$

$$z_k = H_k x_k + v_k \quad (2)$$

where
$x_k$: the state vector of process at time $t_k$
$\Phi_k$: a matrix relating $x_k$ to $x_{k+1}$
$w_k$: a white noise sequence with known covariance structure
$z_k$: measurement vector at time $t_k$
$H_k$: matrix giving the noiseless connection between the measurement and the state vector at time $t_k$
$v_k$: measurement error—assumed to be a white noise sequence with known covariance structure.

We model every tracked rectangle in an image by this equation, $$x_{k+1} = \Phi x_k + w_k \quad (3)$$

where $x_k$ is the state vector representing the rectangle at time k, $\Phi$ is the matrix relating the two consecutive positions of a rectangle, and $w_k$ is zero-mean Gaussian white system noise Referring to FIG. 5, rectangle 220 includes two vertical sides $x_1^1$ and $x_2^1$, and two horizontal sides $y_1^1$ and $y_2^1$. Similarly, rectangle 210 includes two vertical sides $x_1^2$ and $x_2^2$, and two horizontal sides $y_1^2$ and $y_2^2$. The movement of a rectangle can be modelled by the movement of its sides (see FIG. 5). Therefore, Equation 3 is expanded to, $$\begin{bmatrix} x_{1,k+1}^i \\ x_{2,k+1}^i \\ y_{1,k+1}^i \\ y_{2,k+1}^i \end{bmatrix} = \Phi \begin{bmatrix} x_{1,k}^i \\ x_{2,k}^i \\ y_{1,k}^i \\ y_{2,k}^i \end{bmatrix} + w_k^i, \quad i = 1, 2 \quad (4)$$

where $x_{1,k}^i$, $x_{2,k}^i$, $y_{1,k}^i$ and $y_{2,k}^i$ are the sides of the rectangle i at time k, that is, $x_{1,k}^i$, $x_{2,k}^i$, $y_{1,k}^i$ and $y_{2,k}^i$ describe the positions of the sides of the rectangle i at time k.

Let $x_{(t)}$ denote the trajectory of the movement of a side of one of those rectangles where t is the time variable. This function is discretized by sampling with $$f = \frac{1}{h},$$

h>0 where f is the sampling rate, and h is the sample interval. Therefore, $x_k = x_{(kh)}$ k=0,1, . . . .

$x_{(t)}$ is assumed to have continuous first and second order derivatives. Where $x_{(t)}$ is position, the first and second derivatives of $x_{(t)}$ are the velocity and acceleration respectively. For small values of h the position, velocity, and acceleration vectors are calculated by, $$x_{k+1} = x_k + h\dot{x}_k + \tfrac{1}{2}h^2\ddot{x}_k \quad (5)$$

$$\dot{x}_{k+1} = \dot{x}_k + h\ddot{x}_k \quad (6)$$

where
$\dot{x}_k$: velocity—the first derivative
$\ddot{x}_k$: acceleration—the second derivative
$\dot{x}_k = \dot{x}_{(kh)}$ k=0,1, . . .
$\ddot{x}_k = \ddot{x}_{(kh)}$ k=0,1, . . .

Using this dynamic model, our model of Equation 4 is expanded to Equation 7 for i=1, 2.

$$\begin{bmatrix} x_{1,k+1}^i \\ \dot{x}_{1,k+1}^i \\ \ddot{x}_{1,k+1}^i \\ x_{2,k+1}^i \\ \dot{x}_{2,k+1}^i \\ \ddot{x}_{2,k+1}^i \\ y_{1,k+1}^i \\ \dot{y}_{1,k+1}^i \\ \ddot{y}_{1,k+1}^i \\ y_{2,k+1}^i \\ \dot{y}_{2,k+1}^i \\ \ddot{y}_{2,k+1}^i \end{bmatrix} = \begin{bmatrix} 1 & h & \frac{h^2}{2} & & & & & & & & & \\ 0 & 1 & h & & & & & & & & & \\ 0 & 0 & 1 & & & & & & & & & \\ & & & 1 & h & \frac{h^2}{2} & & & & & & \\ & & & 0 & 1 & h & & & & & & \\ & & & 0 & 0 & 1 & & & & & & \\ & & & & & & 1 & h & \frac{h^2}{2} & & & \\ & & & & & & 0 & 1 & h & & & \\ & & & & & & 0 & 0 & 1 & & & \\ & & & & & & & & & 1 & h & \frac{h^2}{2} \\ & & & & & & & & & 0 & 1 & h \\ & & & & & & & & & 0 & 0 & 1 \end{bmatrix} \begin{bmatrix} x_{1,k}^i \\ \dot{x}_{1,k}^i \\ \ddot{x}_{1,k}^i \\ x_{2,k}^i \\ \dot{x}_{2,k}^i \\ \ddot{x}_{2,k}^i \\ y_{1,k}^i \\ \dot{y}_{1,k}^i \\ \ddot{y}_{1,k}^i \\ y_{2,k}^i \\ \dot{y}_{2,k}^i \\ \ddot{y}_{2,k}^i \end{bmatrix} + w_k^i \quad (7)$$

where $x_1^i$, $x_2^i$, $y_1^i$, $y_2^i$ are assumed to have continuous first and second order derivatives denoted by one-dot and double-dot variables, and h>0 is the sampling time.

In the observation equation 2 only the position of a rectangle is observed and the velocity and acceleration are calculated. Therefore, we define the matrix H as following, $$H = [1 \; 0 \; 0] \quad (8)$$

where H gives the noiseless connection between the measured vector $z_k^i$ and the state vector $x_k^i$ in, $$z_k^i = H x_k^i + v_k^i, \quad i=1,2 \quad (9)$$

where
$x_k^i = [x_{1,k}^i \; \dot{x}_{1,k}^i \; \ddot{x}_{1,k}^i \; x_{2,k}^i \; \dot{x}_{2,k}^i \; \ddot{x}_{2,k}^i \; y_{1,k}^i \; \dot{y}_{1,k}^i \; \ddot{y}_{1,k}^i \; y_{2,k}^i \; \dot{y}_{2,k}^i \; \ddot{y}_{2,k}^i]^T$
and $v_k$ is the zero-mean Gaussian white measurement noise. Then the Kalman filtering model takes on the following stochastic description for i=1, 2, $$\begin{cases} x_{k+1}^i = \Phi x_k^i + w_k^i \\ z_k^i = H x_k^i + v_k^i \end{cases} \quad (10)$$

In this model the prediction of the future is performed by projecting the current state ahead, Equation 11.

$$\hat{x}_{k+1}^i = x_k^i \quad (11)$$

Equation 11 predicts the next state of vector x one step in advance. In other words, equation 11 predicts the position of the rectangle i one step in advance. The prediction can also be performed for more than one step by increasing the power of Φ.

Figure 6:
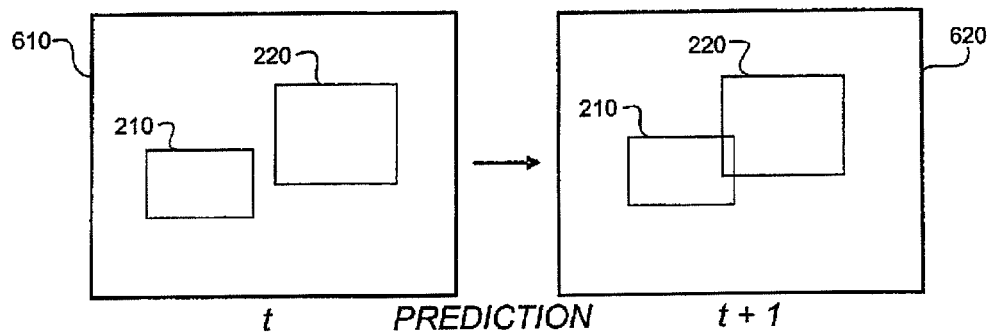
FIG. 6 illustrates a prediction of the intersection of two rectangles.

Referring to FIG. 6, we set an occlusion alarm if the algorithm predicts an intersection between the rectangles 210 and 220 from a window 610 showing position of the rectangles 210 and 220 at time "$t_1$" to a window 620 showing position of the rectangles 210 and 220 at subsequent time "t+1." The prediction may be for the next step or multiple steps in the future. Having the occlusion alarm set, as soon as the hand shapes join together we detect the occlusion. Therefore, we are able to capture the hand-hand occlusion and distinguish it from the other type of occlusion.

The occlusion detection algorithm of one implementation is summarized as follows, ALGORITHM 1:
1. By using Grassfire the hand blobs are extracted and the rectangles are constructed
2. The dynamic model is applied to each rectangle and the future positions are predicted
3. If the predicted rectangles have any intersection the occlusion alarm is set
4. In the next captured image if only one hand is detected by Grassfire and the occlusion alarm is already set the hand-hand occlusion is assumed to have happened. Otherwise, if we see one hand in the image and the occlusion alarm is not set, the other type of occlusion (e.g., occlusion by a part of body or leaving the scene) is assumed to have happened. One or more variables may be set to indicate that occlusion of a particular type has been detected
5. Image capturing is continued
6. In any subsequent step after detecting only one-hand, if two hands are detected in an image while the hand-hand occlusion variable is set (from the previous captured image), then the end of occlusion is detected Using this algorithm, we detect the beginning and end of occlusions.

Now that we have a solution for detecting occlusions we should track the hands and reacquire them at the end of every occlusion period.

Figure 7:
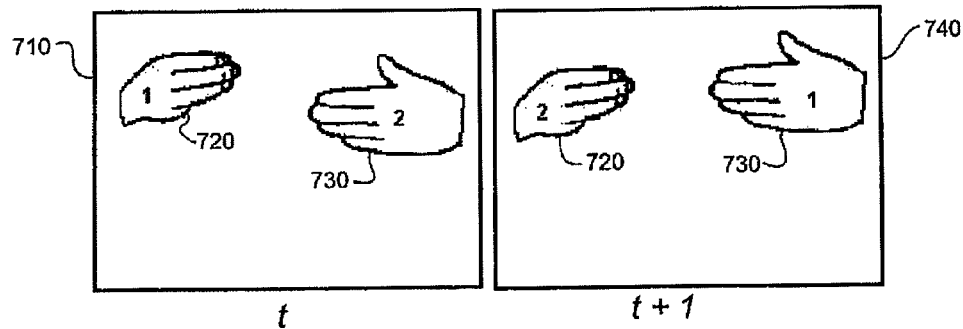
FIG. 7 illustrates a scenario in which two hands may be labeled interchangeably in two consecutive images.

In the hand extraction algorithm (Grassfire), the first shape found in an image is labelled as the first hand. Referring to FIG. 7, and assuming a left to right, top to bottom search, a window at time "t" shows a hand 720 labeled "1" because the search finds hand 720 first, and a hand 730 labeled "2" because the search finds hand 730 second. A window 740 shows that at time "t+1," hand 720 has moved down slightly, and hand 730 has moved up slightly, such that the left to right, top to bottom search finds hand 730 first and hand 720 second—as indicated by labeling hand 730 with "1" and labeling hand 720 with "2." Such re-labeling of hands 720 and 730 may cause confusion, but may be avoided if hands 720 and 730 are tracked.

Another implementation uses the centroid of the hands to track them in a sequence of images. The centroid-based algorithm finds the centroids of the hands and compares them in two consecutive frames. By using this technique we are able to track the hands correctly even when something else occludes them. For example, if one of the hands is occluded or get totally hidden by the body for some moments and then reappears, it can be tracked correctly by keeping records of its last position before occlusion and the position of the other hand. This is expected because when a hand moves behind another object like the body or moves out of the image frame it most probably appears in an area close to the last position before the occlusion. We also have the other hand tracked over the occlusion period. Therefore, if at some point there is only one hand in the image the algorithm may keep tracking the hands properly without any confusion. Other implementations may track the hands using an indicator other than the centroid.

Figure 8:
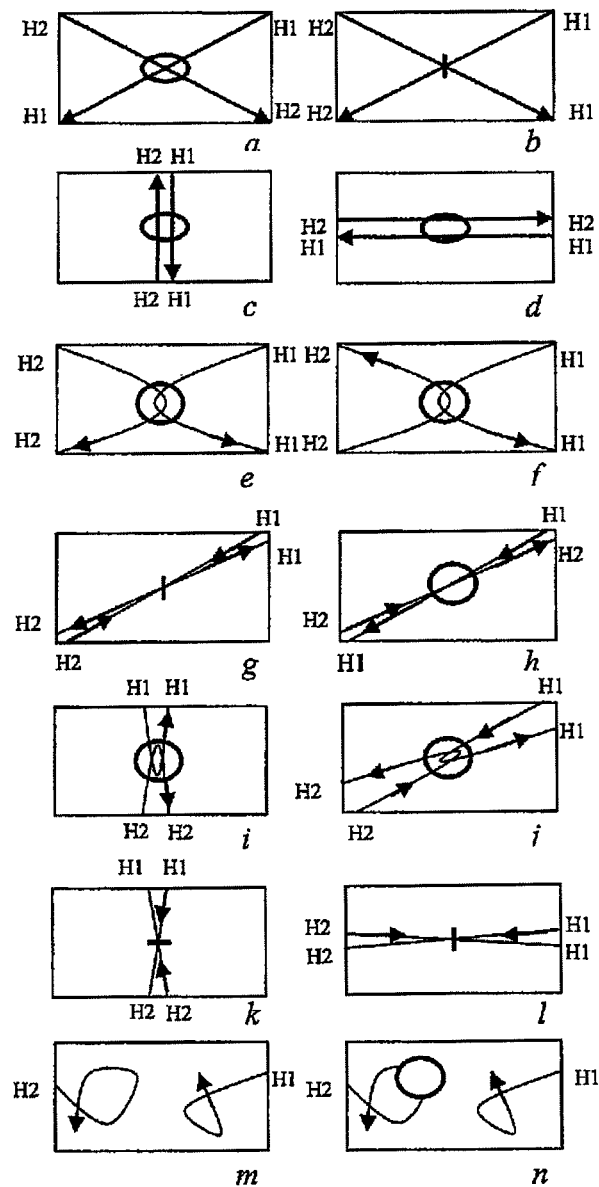
FIGS. 8(a)-8(n) illustrate 14 models of bimanual movements. H1 and H2 represent hand number one and hand number two. The thick ellipses represent the occlusion areas (a, c, d, e, f, h, i, j, and n), and the solid small rectangles represent collision (b, g, k, and l).

In a bimanual movement, when one hand, completely or partially, covers the other hand the hand extraction algorithm detects one big blob in the images. In this case, many applications require distinguishing the hands accurately at the end of occlusion so as to know which hand in the image is the right hand and which one is the left. In order to track the hands we classify the bimanual movements based on the path of each hand's movement. Referring to FIG. 8, the movements are classified as follows, Class 1. The hands move toward each other, one occludes the other for some moments and passes over it. Models of a, c, d, and h presented in FIGS. 8(a), (c), (d), and (h).

Class 2. The hands move toward each other, they collide and return in the opposite directions. Models of b, g, k and l shown in FIGS. 8(b), (g), (k), and (l).

Class 3. The hands move, at some point one occludes the other with no collision and they return to their previous sides. Movements of models e, f, i, and j shown in FIGS. 8(e), (f), (i), and (j).

Class 4. The hands move with no hand-hand occlusion. Occasionally one of the hands may be occluded by something else either partially or completely. Movements of models m and n shown in FIGS. 8(m) and (n).

In the first class the hands continue their smooth movements without any collision. In the second class they collide and change their path. In the third class they do not collide but change their path. And in the fourth class there is no hand-hand occlusion. In one implementation, a tracking system recognizes these classes and identifies the hands correctly at the end of occlusion.

For example, clapping can be represented by model g, tying a knot by model j, etc. We aim to reacquire the hands at the end of occlusion period. Therefore, in one implementation, we find the class that a movement belongs to in order to understand the behavior of the hands during a hand-hand occlusion period.

In one implementation, we approach the problem from a neuroscience point of view, because in this way we may be able to understand the behavior of the hands during the occlusion periods.

Neuroscience studies show that in bimanual movements the hands tend to be synchronized effortlessly. This synchronization appears in both temporal and spatial forms. Temporally, when the two hands reach for different goals they start and end their movements simultaneously. For example, when people tap with both hands, the taps are highly synchronized. Spatially, we are almost not able to draw a circle with one hand while simultaneously drawing a rectangle with the other.

Temporal coordination implies that the hands' velocities are synchronized in bimanual movements. Also, the hands' pauses happen simultaneously. We may exploit the hands' temporal coordination to track the hands in the presence of occlusion.

In order to detect the pauses we monitor the hands' velocities. A well-known experiment called circle drawing shows that the two hand velocities are highly synchronized in bimanual movements. We introduce a tracking technique based on the dynamic model introduced earlier and the bimanual coordination phenomenon just described.

Figure 9:
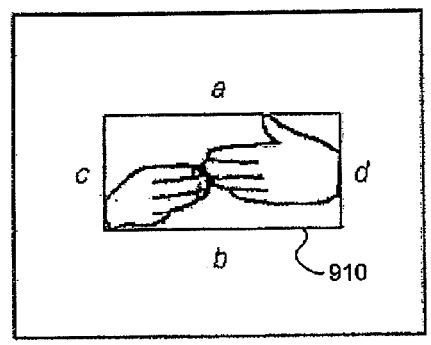
FIG. 9 illustrates an occlusion-rectangle formed around the big blob of hands.

Referring to FIG. 9, as before, a rectangle is constructed around each hand. As soon as the occlusion is detected by the occlusion-detection algorithm a rectangle 910 around the big blob is formed. We call rectangle 910 the occlusion-rectangle.

We use the dynamic model to model the occlusion-rectangle. Therefore, for every side of the rectangle the position x, velocity ẋ, and acceleration ẍ, are involved in the model. The horizontal movement of the hands are modelled by the vertical sides, c and d in FIG. 9, and the vertical movement by the horizontal sides, a and b. For simplicity we define the following auxiliary variables, $v_a = \dot{x}_a$: velocity of side a
$v_b = \dot{x}_b$: velocity of side b
$v_c = \dot{x}_c$: velocity of side c
$v_d = \dot{x}_d$: velocity of side d Then the following hand-pause model is defined to model the "velocities" of the hands in the vertical and horizontal directions, $$\begin{cases} v_{v,k} = \sqrt{v_{a,k}^2 + v_{b,k}^2} \\ v_{h,k} = \sqrt{v_{c,k}^2 + v_{d,k}^2} \end{cases} \quad (12)$$

where the subscript k indicates the discrete time index, and the defined terms are referred to as "velocities."

In the movements where the hands either collide or pause (for example, classes 2 and 3), the hands return to the same sides that the hands were on prior to the occlusion period. In these movements the parallel sides of the rectangle in either horizontal or vertical directions pause when the hands pause or collide. For example, in the models of e, f and l the hands horizontally pause and return to their previous sides. In the models g and j they pause and return in both horizontal and vertical directions. The horizontal pauses of the hands are captured by the pauses of the vertical sides of the occlusion-rectangle, and the vertical pauses of the hands are captured by the pauses of the horizontal sides. Due to bimanual coordination, the pauses of the parallel sides are typically simultaneous. In other words, when the hands pause either horizontally or vertically the parallel sides associated with the horizontal and vertical movements of hands typically pause simultaneously. For example, in the models i and k the horizontal sides of the occlusion-rectangle typically pause simultaneously when the hands pause or collide vertically during occlusion. In this case the velocities of the horizontal sides of the occlusion-rectangle reach zero. This is captured by $v_{v,k}$ in the hand-pause model. In fact, a small threshold $\epsilon > 0$ can provide a safe margin because we are working in discrete time and our images are captured at discrete points in time. If $v_{v,k}$ or $v_{h,k}$ falls below the threshold we conclude that the hands have paused vertically or horizontally. By detecting the pauses in the horizontal or vertical direction we may conclude that the hands have paused or collided and returned to the same sides prior to occlusion in that direction.

In the movements where the hands pass each other, no pause or collision is detected but a change in the sign of the velocities is observable. Referring to FIG. 10, the sign change is due to the fact that when the hands pass each other they push the sides in opposite directions. A window 1010 shows two hands 1020 and 1030 approaching each other, resulting in vertical sides "c" and "d" approaching each other. A window 1040 shows, at a point in time later than window 1010, hands 1020 and 1030 pushing past each other such that vertical sides "c" and "d" are pushing away from each other. Therefore, the sign of the velocities are changed without passing through zero. If no hand pause is detected we conclude that the hands have passed each other.

In a typical movement the hand shapes may change during an occlusion period. For example, in a movement where the hands move, the fingers may also move simultaneously so that the shape of the hand changes. In this case the movement of fingers may be considered in an attempt to detect simultaneous pauses of the hands.

Research shows that fingers and hand are coordinated too in the movement of one hand. In other words, the hand and fingers are temporally synchronized. Our experiment shows that the velocity of the hand and the velocity of the fingers are highly synchronized with almost no phase difference. Therefore, the pauses of the hand and the pauses of the fingers that change the hand shape may be expected to happen simultaneously. The hand-finger coordination typically guarantees that the velocities of the parallel sides of the rectangle are synchronized and the pauses happen simultaneously, regardless of whether finger movement causes the hands to change shape. This phenomenon typically makes the algorithm independent of the changing hand shape.

In some of the models where the hands have purely horizontal (models d and l) or vertical (models c, i, and k) movements, an unwanted pause may be detected in the vertical or horizontal directions because the velocity of the static direction (vertical or horizontal) will be small according to equation 12. For example, when the hands move only horizontally (see FIG. 8(d)) a vertical pause may be detected because vertically the hands do not have much movement and the speed of the vertical sides may reach zero.

Also, in the models where a pair of parallel sides of the occlusion-rectangle move in the same up, down, left, or right direction (e.g., horizontal sides in models a, b, and e), while no zero velocity (pause) is detected, we may wrongly conclude that the hands have passed each other in that direction (vertical direction in models a, b, and e) because the velocity might not go below a threshold. Further, if the movement in the same direction is slow, then the velocity provided by equation 12 may fall below the threshold, and falsely indicate a pause in that direction.

In order to solve these problems we classify the velocity synchronization of the hands into two classes, positive and negative. In the movements where the two hands move in opposite directions (e.g., left and right) the velocities are negatively synchronized, while in the movements where they move in the same direction (e.g., down) the velocities are positively synchronized.

To distinguish the positive and negative synchronizations we define the following velocity-synchronization model, which is the standard deviation of the relative velocities of the parallel sides, $$\begin{cases} s_v^2 = \frac{1}{N-1} \sum_i \left[ (v_{a,i} - v_{b,i}) - \frac{1}{N} \sum_j (v_{a,j} - v_{b,j}) \right]^2 \\ s_h^2 = \frac{1}{N-1} \sum_i \left[ (v_{c,i} - v_{d,i}) - \frac{1}{N} \sum_j (v_{c,j} - v_{d,j}) \right]^2 \end{cases} \quad (13)$$

where N is the number of images (frames) during the occlusion period, i and j are the frame indices, $v_{a,k}$, $v_{b,k}$, $v_{c,k}$, and $v_{d,k}$ are the velocities of sides a, b, c, and d at the $k^{th}$ frame during hand-hand occlusion.

This model results in small standard deviations in purely horizontal or purely vertical movements as well as the movements where the parallel sides are positively synchronized. For example, in a movement of model c, the vertical sides of the occlusion-rectangle have almost no movement during the occlusion period. Therefore, $s_h$ in the velocity-synchronization model (System 13) will be small. In model e, the horizontal sides of the occlusion-rectangle are positively synchronized. $s_v$ in this case becomes small. However, if the velocities of the parallel sides of the occlusion-rectangle are negatively synchronized (e.g., model f) the standard deviations are large because in this case the velocities of parallel sides are in opposite directions with different signs. The thresholds for small $s_h$ and $s_v$ may be determined by experiment.

Before we detect the hand pauses we capture any possible positive synchronization of parallel sides of the occlusion-rectangle during the occlusion period using the velocity-synchronization model. If a positive synchronization for any pair of parallel sides is observed, the tracking is performed based on the pauses of the other sides of the occlusion-rectangle. For example, if a small $s_v$ is observed we base the tracking on the pauses of the other sides, c and d. A small standard deviation in the velocity-synchronization model means that a pair of parallel sides of the rectangle has been positively synchronized with quite similar velocities during occlusion. Therefore, we should look at the pauses of the other sides of the occlusion-rectangle during occlusion to gain the desired information for distinguishing left and right hands after the occlusion.

Based on the velocity-synchronization and hand-pause models the hand tracking algorithm is summarized as following, ALGORITHM 2:
1. If the horizontal sides of the rectangle are positively synchronized (small $s_v$) during the occlusion period
   1.A. If during occlusion there is a k such that $v_{h,k} < \epsilon$ then: the hands are horizontally back to their original position/side (for example, left or right)
   1.B. Else: the hands horizontally passed each other
2. Else: if the vertical sides of the rectangle are positively synchronized (small $s_h$) during the occlusion period
   2.A. If during occlusion there is a k such that $v_{v,k} < \epsilon$ then: the hands are vertically back to their original position/side (for example, top or bottom)
   2.B. Else: the hands vertically passed each other
3. Else: if during occlusion there is a k such that $v_{h,k} < \epsilon$ then: the hands are horizontally back to their original position/side
4. Else: if during occlusion there is a k such that $v_{v,k} < \epsilon$ then: the hands are vertically back to their original position/side
5. Else: the hands passed each other The above algorithm tracks the hands during a hand-hand occlusion and makes a decision on the positions of the hands at the end of occlusion with respect to their positions prior to occlusion. The above algorithm 2 may be modified in various ways to provide information on the position of the hands after occlusion. The form of algorithm 2 presented above typically provides enough information to distinguish the left and right hands after occlusion.

Implementations of algorithm 2, and other algorithms, may provide increased robustness by verifying that (1) the vertical sides are negatively synchronized in step 1, and/or (2) the horizontal sides are negatively synchronized in step 2. Another implementation uses a tracking algorithm having a different hand-pause and hand-pass detection methodology.

During an occlusion period the number of images should ideally be large enough so that the velocities converge to zero in the cases of hand collisions and pauses. The algorithm should have enough time and images so that the rectangle's sides' velocities reach zero in the cases that a collision or pause occurs. The proposed Kalman filter is based on the Kinematics equations of motion. Therefore, in a fast movement (with an insufficient number of images), the sides of the occlusion-rectangle have the potential to move further rather than to stop quickly. That is, if the samples are too far apart, the velocities below the threshold may be missed.

If the speed of movement increases the estimated speeds of the rectangle's sides may not exactly reach zero. This problem becomes more difficult if the camera is working in a low speed (low frame rate). Therefore, the algorithm may not detect collisions and pauses accurately. Also, in some applications where the visual system moves (e.g., active vision) the velocities may not exactly reach zero. Therefore, we develop a technique to make the algorithm independent of the actual velocities, and investigate the speed changes of the occlusion-rectangle's sides.

When a pause occurs the estimated velocity tends to zero. We assume that the hands are moving towards each other with almost constant velocities. The acceleration is almost zero. When a pause occurs the acceleration increases in negative direction in order to push the velocity to zero.

After the pause, the rectangle's sides move in opposite directions. The velocities change in the same fashion but in the negative direction. Therefore, referring to FIG. 11(a), the velocity during the occlusion period looks like a graph 1110. Also, referring to FIG. 11(b), in the cases where the hands pass each other the velocity of a rectangle's side looks like a graph 1120. The rapid sign change in the graph is due to pushing the rectangle's sides in opposite directions when the hands pass each other as shown in FIG. 10. In various implementations, graph 1120 may be a step function, but a hand-pass may produce a non-step function as depicted.

According to a neuroscience theory, there exists noise in the motor commands in the human nervous system. In the presence of such noise the intended motor commands will generate a probability distribution over the hand positions and velocities if repeated several times. In accordance with this theory, we model the velocity changes by gaussian distributions. By capturing the velocities throughout different movements, a series of 2-dimensional gaussian distributions is constructed for each type of behavior, the hand-pause and the hand-pass. The following function is defined in order to represent a pair of parallel sides of the occlusion-rectangle, $$v(t) = v_1(t) - v_2(t) \tag{14}$$

where $v_1(t)$ and $v_2(t)$ are the velocities of a pair of parallel sides at time t. When the hands are negatively synchronized, this function results in a velocity equal to the sum of the individual velocities. An important feature of this function is that it makes the algorithm independent of the actual velocities. Therefore, in some applications (e.g., active vision) the effect of a constant value added to the both velocities is eliminated.

Referring to FIG. 12, the gaussian distributions for successive values of Function 14 are shown. FIG. 12(a) shows distributions 1205-1240 in the movements where a pause is detected. FIG. 12(b) shows distributions 1245-1280 for the movements where the hands pass each other. In FIGS. 12(a)-(b), each ellipse 1205-1280 represents a 2-dimensional gaussian distribution.

A decision on whether the hands have passed each other or paused and returned is made based on the probabilities that Function 14 for a given movement matches each of the two patterns in FIGS. 12(*a*) and (*b*). The probabilities are calculated using the following equation, $$P(v_o \mid H_i) = \prod_j \max_k (P(v_o^j \mid H_i^k)) \quad i = 1, 2 \qquad (15)$$

$$v_o = \{v_o^1, v_o^2, \ldots \}$$

where $v_o$ stands for the set of observed velocities over a given occlusion period calculated by Function 14, $v_o^j = v(j)$ is the observed velocity at time j during occlusion, $H_i^k$ is the $k^{th}$ gaussian distribution in the pattern $H_i$, and $P(v_o^j \mid H_i^k)$ is calculated using the multidimensional gaussian probability density function, $$P(v_o^j \mid H_i^k) = \prod_{l=1}^{2} \frac{1}{\sigma_{k,l}\sqrt{2\pi}} e^{-\left(\frac{(v_l^j - \mu_{k,l})^2}{2\sigma_{k,l}^2}\right)} \qquad (16)$$

where $\sigma_{k,l}$ stands for the standard deviation of distribution $H_i^k$ on the $l^{th}$ principal axis of the $k^{th}$ distribution, $\mu_{k,l}$ is the mean of the distribution on the $l^{th}$ principal axis of the $k^{th}$ distribution and v stands for the component of point $v^j = v(j)$ projected on the $l^{th}$ principal axis of the distribution.

We may apply equations 15 and 16 to a set of observed velocities, assuming, for example, that the set of gaussian distributions is as depicted in FIGS. 12(*a*) and (*b*), in which k=8 for both $H_1$ (pause; FIG. 12(*a*)) and $H_2$ (pass; FIG. 12(*b*)). For each observed velocity, we determine the distribution 1205-1240 that maximizes the probability of that observed velocity, and multiply each of these probabilities. Do the same using the distributions 1245-1280, and select the result (pause or pass) producing the higher product.

In order to train the distributions we classify the velocity points for each gaussian distribution $H_i^k$ in the pattern $H_i$. Vector Quantization (VQ) is an unsupervised clustering technique that clusters the data points for each gaussian distribution. By applying VQ to a set of training velocity data points in each pattern the data points of each distribution are classified into regions. Then by using Principal Component Analysis the parameters (standard deviation and mean) of the gaussian distribution for each region are determined. Using this pattern matching technique, we can detect the hand pauses even if the velocities do not converge to zero.

We summarize the algorithm as follows,

ALGORITHM 3:

Using the occlusion detection technique, the beginning and the end of the occlusion period is detected 1. If the horizontal sides of the rectangle are positively synchronized (small $s_v$) during the occlusion period
   1.A. If the probability (Equation 15) for the vertical sides for the class of hand-pause is higher than for the class of hand-pass: the hands went horizontally back to their original sides
   1.B. Else: the hands horizontally passed each other
2. Else: if the vertical sides of the rectangle are positively synchronized (small $s_h$) during the occlusion period
   2.A. If the probability (Equation 15) for the horizontal sides for the class of hand-pause is higher than for the class of hand-pass: the hands went vertically back to their original sides
   2.B. Else: the hands vertically passed each other 3. Else: if the probability (Equation 15) for the vertical sides for the class of hand-pause is higher than for the class of hand pass: the hands went horizontally back to their original sides
4. Else: if the probability (Equation 15) for the horizontal sides for the class of hand-pause is higher than for the class of hand-pass: the hands went vertically back to their original sides
5. Else: the hands passed each other By using a tracking algorithm, such as, for example, one of the tracking algorithms described above, we can separate the hands from each other and look at the movement of each hand individually in order to understand the whole bimanual movement. The meaning of the hands movements is combined so that the bimanual movement is recognized as a single entity. We introduce a Bayesian network for the recognition of bimanual movements. However first, we segment a bimanual movement into occlusion and non-occlusion parts.

In order to separate the hands we may use one of the proposed tracking algorithms to track the hands individually in a sequence of images. Therefore, we are able to separate the movement of each hand while no hand occlusion exists. However, when we have occlusion the hands are not separately recognized. Thus, we do not separate the movements of the hands.

In one implementation, we take the occlusion parts into account and recognize them separately. Then, the recognized individual movements of the separated hands and the occlusion parts are fused in order to understand the whole bimanual movement.

Figure 13:
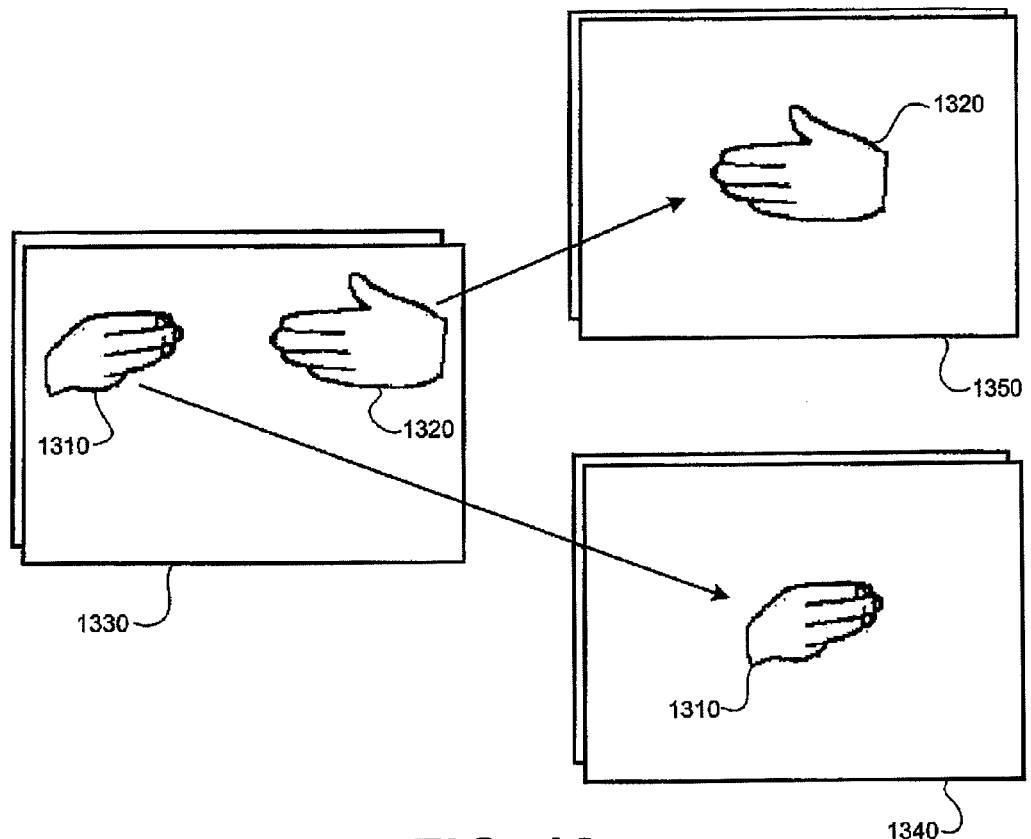
FIG. 13 illustrates hand movements being separated and projected into blank sequences of images.
Figure 14:
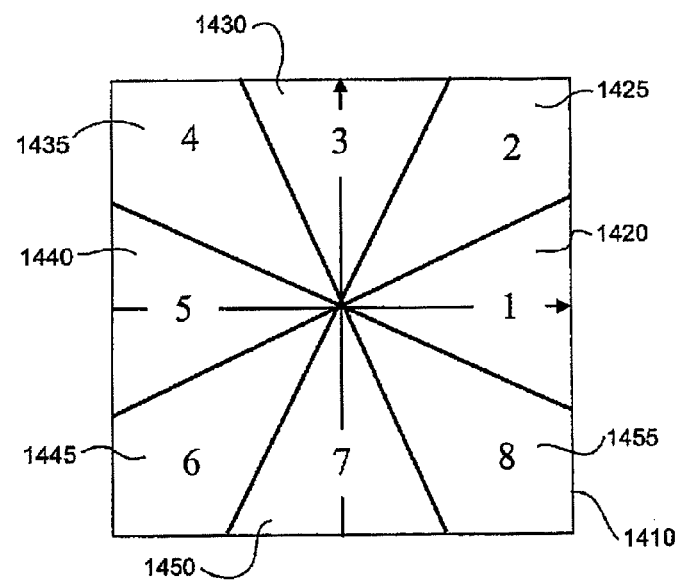
FIG. 14 shows an image frame divided into 8 equal regions to represent direction of movement.

Referring to FIG. 13, each hand is tracked and separately projected into a blank sequence of images. For example, two hands 1310 and 1320 on an image 1330 are separately projected onto individual images 1340 and 1350, respectively. In order to preserve the movement of the hands with respect to the image frame, the direction of movement of each hand is recorded. Referring to FIG. 14, to record direction of movement, we divide a 2-dimensional space of an image frame 1410 into 8 equal regions 1420-1455. We call the divided frame 1410 the regional-map. The index (1-8) of each region represents the direction of movement in that region. An index of zero (not shown in frame 1410) represents a stationary hand.

Figure 15:
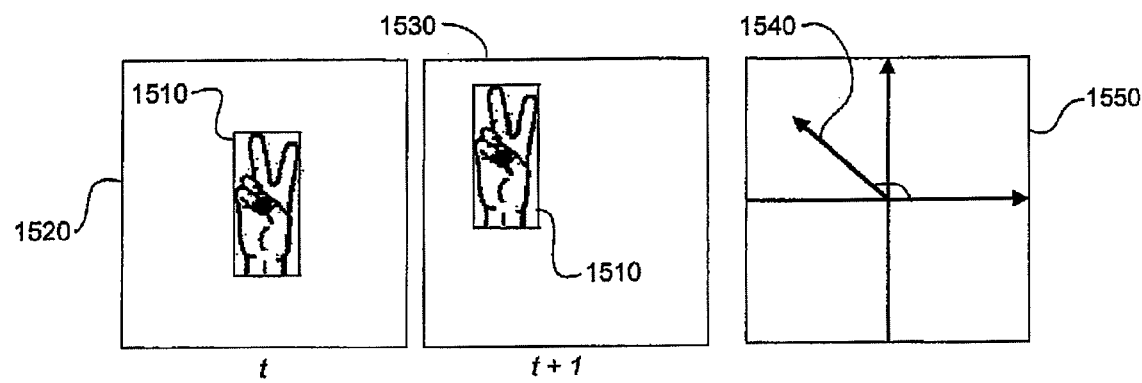
FIG. 15 includes a series of images illustrating hand movement and an extracted vector for the movement.

By tracking the movement of the center of each hand a vector representing the movement is extracted for every single frame. This vector represents the movement from the last image to the present one. Referring to FIG. 15, a hand 1510 is shown at time "t" in frame 1520 and at time "t+1" in frame 1530. The movement of hand 1510 from time "t" to time "t+1" is represented by a vector 1540 in window 1550. The angle of the vector with respect to the horizontal axis determines the region in the regional-map in which the vector maps onto. The region index is recorded for the movement at each time t. Even for a partial sequence including hand-hand occlusion the direction vectors for the movement of the big blob is extracted and the region indices are recorded. Implementations may consider the speed of the gesture, for example, by determining and analyzing an appropriate magnitude for vector 1540.

Figure 16:
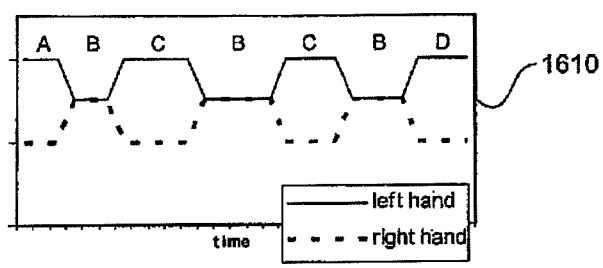
FIG. 16 illustrates the segmentation of a bimanual movement over a period of time. The separate lines at segments A, C, and D show the separated hands. In segments B the overlaped lines show hand-hand occlusion.

A bimanual movement is constituted from two groups of parts, the occlusion parts in which one hand is occluded, and the other parts. The parts in which the hands are recognizable separately are called non-occlusion parts. Since a bimanual movement can be a periodic movement like clapping we separate different parts, which we call segments. Four segments are obtained as following, A. The beginning segment, from the beginning of a gesture to the first occlusion part
B. The occlusion segments, where one hand is occluded by the other hand
C. The middle segments, a part of the gesture between two consecutive occlusion segments
D. The ending segment, from the last occlusion segment to the end of the gesture Referring to FIG. 16, an example of a segmented bimanual movement is illustrated in window 1610 over the time axis. Although we have assumed in this figure that the movement starts and ends in non-occlusion segments, other implementations extend the algorithm to other cases. Also, for the gestures in which no occlusion segment is observed the process is the same with only one segment (a beginning segment) for the whole gesture.

In a bimanual movement there can be several occlusion and middle segments. For example, in FIG. 16 there are 3 occlusion segments labelled "B," and 2 middle segments labelled "C," as well as a beginning segment labelled "A" and an ending segment labelled "D". Thus, the implementation is able to deal with multiple occlusion and middle segments as well as the beginning and the ending segments in order to understand the whole bimanual movement.

The movement of a hand within a segment (or the two hands within an occlusion segment) is treated as a single movement appearing in the sequence of images of the segment. These movements are modelled and recognized by Hidden Markov Models, although other models may be used. Therefore, for a bimanual movement we get a set of recognized movements of each of the two hands, and the recognized movements of the occlusion parts. This information is combined to recognize the bimanual movement.

Figure 17:
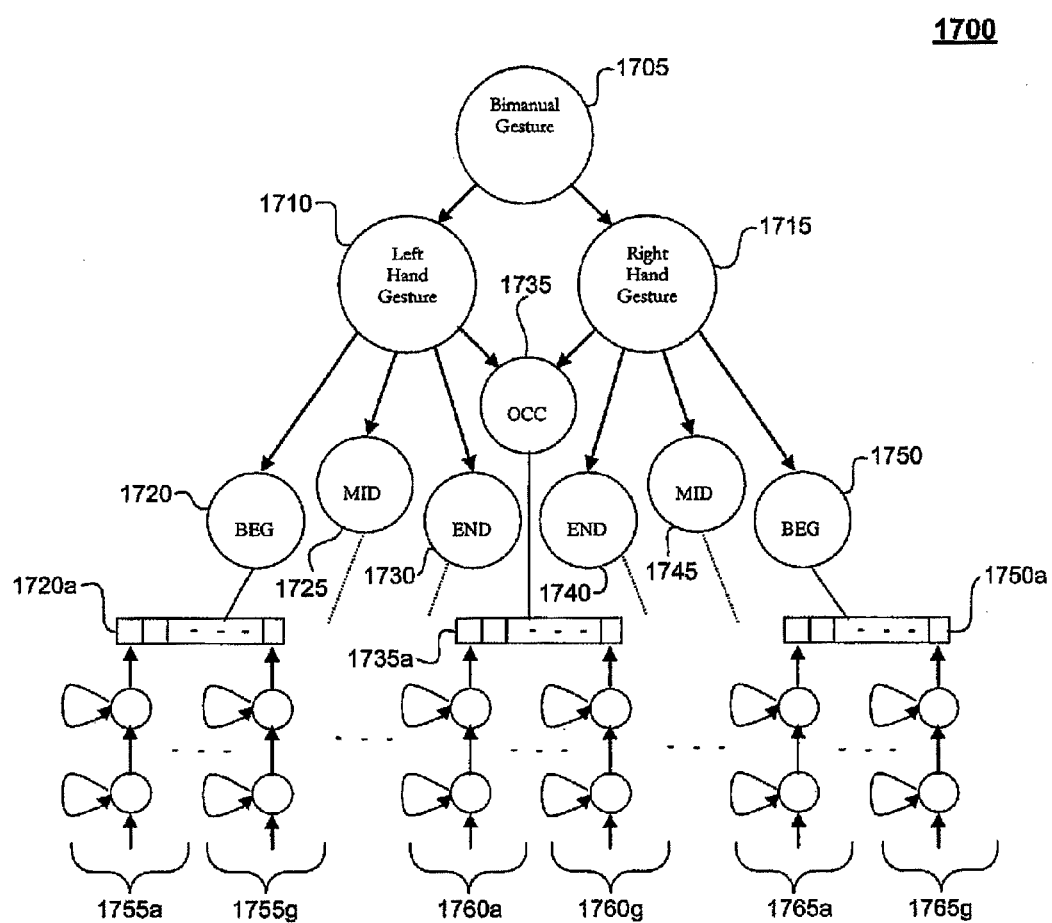
FIG. 17 shows a Bayesian network for fusing Hidden Markov Models for the recognition of bimanual movements.

One implementation uses a Bayesian network in which the whole gesture is divided into the movements of the two hands. Referring to FIG. 17, the movement of each hand is also divided into the four segments through the evidence nodes of BEG, MID, OCC, and END. The occluded part of a gesture is a common part for both hands. Therefore, a single shared node, OCC, is considered. Specifically, a tree 1700 includes a top node "Bimanual Gesture" 1705, that includes a left-hand gesture node 1710 and a right-hand gesture node 1715. Left-hand gesture node 1710 and right-hand gesture node 1715 include BEG evidence nodes 1720 and 1750, respectively, MID evidence nodes 1725 and 1745, respectively, and END evidence nodes 1730 and 1740, respectively, and share a common OCC node 1735.

According to the number of cases a node can accept, each node in this tree represents a multi-valued variable. Thus, for a vocabulary containing g bimanual gestures every node is a vector with length g, as shown with vectors 1720a, 1735a, and 1750a. The three top nodes of Bimanual Gesture, Left Hand Gesture, and Right Hand Gesture are non-evidence nodes updated by the messages communicated by the evidence nodes. The evidence nodes are fed by the Hidden Markov Models of different segments separately, as shown with models 1755a, 1755g, 1760a, 1760g, 1765a, and 1765g.

Figure 18:
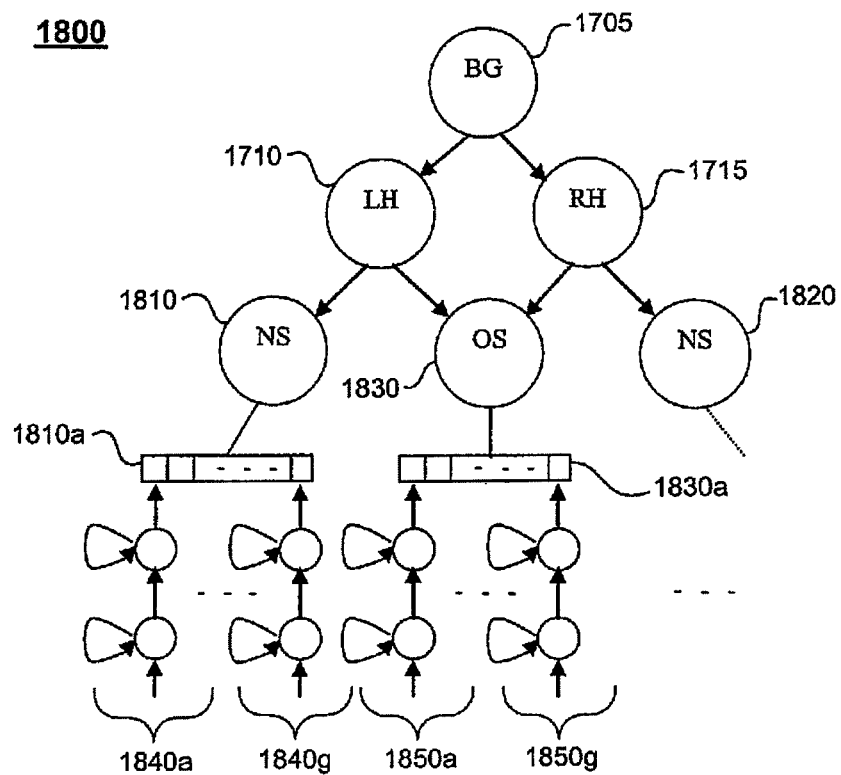
FIG. 18 shows an abstracted Bayesian network, based on FIG. 17, for the recognition of bimanual movements.
Figure 20A:
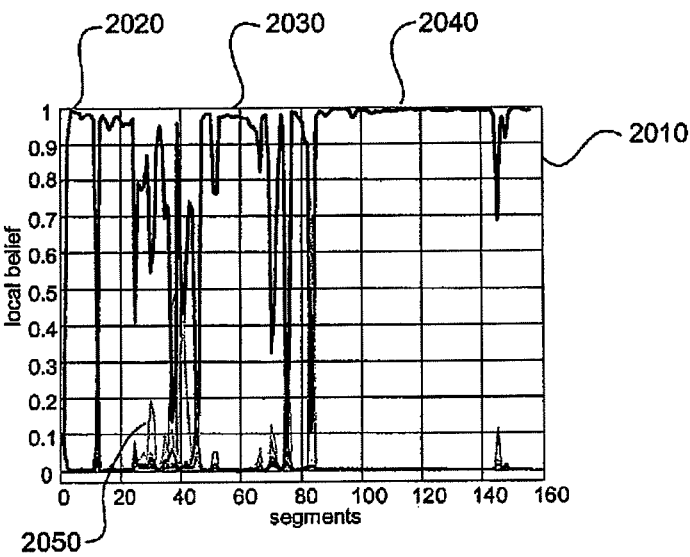
FIG. 20(a) graphs the local belief of the root node for three concatenated bimanual movements.
Figure 20B:
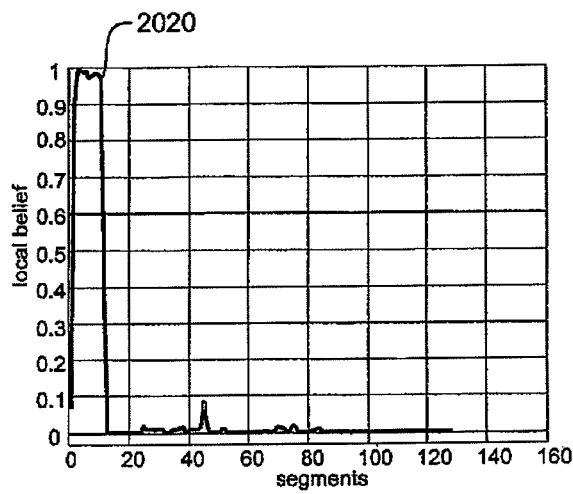
FIGS. 20(b)-(e) isolate various graphs from FIG. 20(a) associated with particular gestures.
Figure 20C:
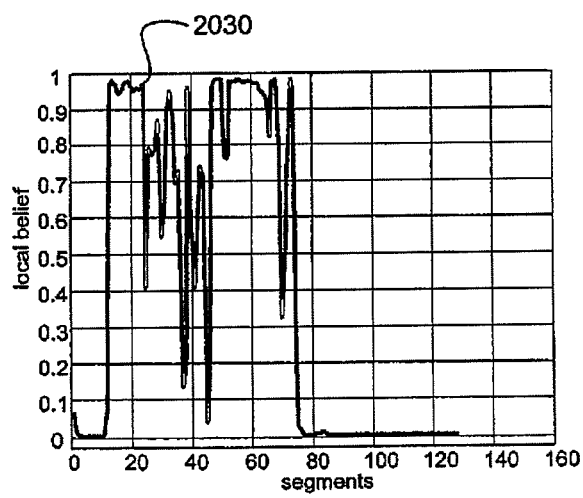
Figure 20D:
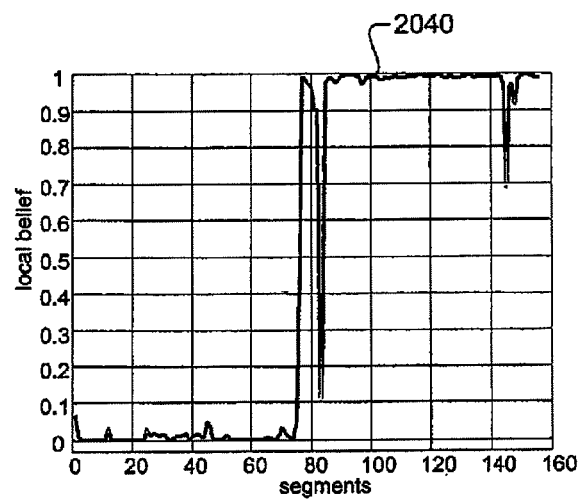
Figure 20E:
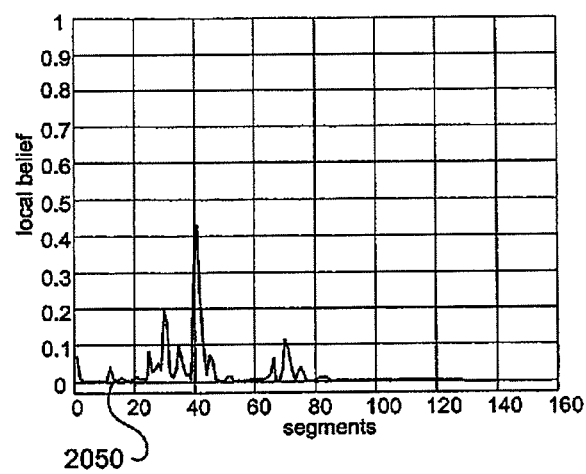

Referring to FIG. 18, due to the fact that the beginning, middle, and ending segments of a gesture have no time overlapping, and assuming that the segments are of equal weight, the causal tree 1700 can be abstracted to tree 1800 that includes non-occlusion segment nodes (NS nodes) 1810 and 1820, and occlusion segment node (OS node) 1830. Node 1810 is associated with vector 1810a, and with models 1840a through 1840g. Analogously, node 1830 is associated with vector 1830a and with models 1850a through 1850g. The NS nodes 1810 and 1820 represent the evidences of the beginning, middle, and ending segments at different times for each hand. These evidences are the normalized vectors of likelihoods provided by the Hidden Markov Models at the lowest level of the network. These values represent the likelihoods that a given partial gesture (including movements in any non-occlusion segment) is each of the gestures in the vocabulary in the corresponding segment.

In order to recognize the whole movement we recognize the partial gestures of each segment separately. For this, we construct an eigenspace for each hand. An eigenspace is made by using a set of training images of a hand in a given segment and Principal Component Analysis. The covariance matrix of the set of images is made and the eigenvalues and eigenvectors of the covariance matrix are calculated. The set of eigenvectors associated with the largest eigenvalues are chosen to form the eigenspace. The projection of the set of training images into the eigenspace is the Principal Components. A separate eigenspace is created, also, for the occlusion segments. These eigenspaces are made by the movements in the training set. By projecting all the images of one hand into its own eigenspace a cloud of points is created. Another dimension is also added to the subspaces which is the motion vector extracted using the regional-map.

A set of codewords is extracted for each eigenspace using Vector Quantization. The set of extracted codewords in each eigenspace is used for both training and recognition. By projecting a segment of a gesture into the corresponding eigenspace a sequence of codewords is extracted.

Figure 19:
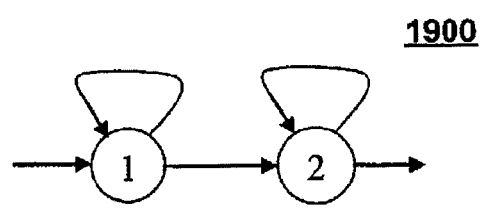
FIG. 19 shows a 2-state left-to-right Hidden Markov Model assigned to partial gestures.

Referring to FIG. 19, to each hand in a non-occlusion segment a 2-state left-to-right Hidden Markov Model 1900 is assigned. Due to the fact that a partial movement of a hand in a segment is normally a short Movement, a 2-state HMM is typically suitable to capture the partial movement. Every segment of a gesture has its individual HMMs. Thus, for every gesture in the vocabulary of bimanual movements seven HMMs are assigned, two for the beginning segments for the two hands, one for the occlusion segments, two for the middle segments, and two for the ending segments. By using the extracted sequence of codewords the HMM of each hand in a segment is trained. The HMMs of the occlusion segments are trained by the extracted sequence of codewords of the projected images into the corresponding eigenspace. For example, for a vocabulary of 10 bimanual movements 70 HMMs are created and trained.

In the recognition phase the same procedure is performed. A given gesture is segmented. Images of each segment are projected into the corresponding eigenspace and the sequences of codewords are extracted. By employing the trained HMMs, the partial gesture of each hand presented in a segment is recognized. However, we use the HMMs to calculate the likelihoods that a given partial gesture is each of the corresponding partial gestures in the vocabulary. A normalized vector of the likelihoods for a given partial gesture in a segment is passed to one of the evidence nodes in the Bayesian network of FIG. 18. For example, the second scalar in the NS vector 1810a of the left hand is the likelihood that:

In a beginning segment: the given partial gesture is the beginning segment of gesture number 2 in the vocabulary, calculated by the HMM of the beginning segment of the left hand of gesture number 2

In a middle segment: the given partial gesture is the middle segment of gesture number 2 in the vocabulary, calculated by the HMM of the middle segment of the left hand of gesture number 2 and so on.

The occlusion vector, which is fed by the likelihoods of the HMMs of the occlusion segments, is a shared message communicated to the LH and RH nodes and, ultimately, the BG node, as evidences for the two hands. The LH, RH, and BG nodes calculate their beliefs, that is, their vectors of the likelihoods of the possible gestures, using, for example, the well-known belief propagation algorithm.

As an example, in one implementation, three sets of training images (left, right, and occluded) are extracted from videos of gestures. Each image may contain, for example, 1024 pixels. To reduce the dimensionality of the space, eigenspaces of lower dimensionality are determined for the training data. The training data is projected into the eigenspace to produce reduced dimensionality training data. To reduce the number of calculations in the recognition phase, codewords are determined for the eigenspaces. HMMs are then developed using the sequences of codewords corresponding to appropriate segments of the training data for given gestures.

Images of a given gesture are then projected into the appropriate eigenspace and the closest codewords are determined, producing a sequence of codewords for a given set of images corresponding to a segment of a gesture. The sequence of codewords is then fed into the appropriate HMMs (segment and gesture specific) to produce likelihoods that the segment belongs to each of the trained gestures. These likelihoods are then combined using, for example, the belief propagation algorithm.

The network looks loopy (containing a loop). The nodes of BG, LH, OS, and RH form a loop. Therefore, the network does not seem to be singly connected and a message may circulate indefinitely. However, the node OS is an evidence node. Referring to the belief propagation rules of Bayesian networks the evidence nodes do not receive messages and they always transmit the same vector. Therefore, the NS and OS nodes are not updated by the messages of the LH and RH nodes. In fact, the LH and RH nodes do not send messages to the evidence nodes. Therefore, although the network looks like a loopy network, the occlusion node of OS cuts the loop off and no message can circulate in the loop. This enables us to use the belief propagation rules of singly connected networks in this network.

The procedure in this implementation of recognizing partial gestures and fusing the results by the proposed Bayesian network in order to recognize a bimanual movement is summarized in the following algorithm, ALGORITHM 4:
1. A bimanual gesture is segmented by a tracking algorithm
2. The beginning segment
   2.1. For every hand the beginning segment is projected into the eigenspace of the corresponding hand
   2.2. The sequence of codewords is extracted for each hand using, for example, the Principal Components and the motion vectors
   2.3. By employing the HMMs of the beginning segment of each hand the vector of likelihoods is calculated and normalized
   2.4. The vectors of likelihoods are passed into the corresponding NS nodes while the vector of occlusion node is set to a vector of all 1s.
   2.5. The nodes' beliefs are updated by the belief propagation algorithm
3. An occlusion segment
   3.1. The image sequence of the segment is projected into the eigenspace of the occlusion segments
   3.2. A sequence of codewords is extracted using the Principal Components and the motion vectors
   3.3. The vector of likelihoods is calculated and normalized by using the corresponding HMMs
   3.4. The vector is passed to the OS node
   3.5. The nodes' beliefs are updated by the belief propagation algorithm
4. A middle segment
   4.1. For every hand the corresponding image sequence is projected into the corresponding eigenspace
   4.2. The sequences of codewords are extracted using the Principal Components and the motion vectors
   4.3. The vectors of likelihoods are calculated and normalized by using the corresponding HMMs
   4.4. The vectors of likelihoods are passed to the corresponding NS nodes
   4.5. The nodes' belief are updated by the belief propagation algorithm
5. A second type of occlusion segment—where another type of occlusion is detected in which only one hand is present in the scene during the occlusion segment
   5.1. For the hand present in the scene the corresponding image sequence is projected into the corresponding eigenspace
   5.2. The sequences of codewords are extracted using the Principal Components and the motion vectors
   5.3. The vector of likelihoods is calculated and normalized by using the corresponding HMMs
   5.4. The vector of likelihoods is passed to the corresponding NS node
   5.5. The nodes' belief are updated by the belief propagation algorithm
6. While there are more occlusion and middle segments the parts 3 to 5 of the algorithm are repeated
7. The ending segment
   7.1. For every hand the image sequence is projected into the corresponding eigenspace
   7.2. The sequence of codewords are extracted using the Principal Components and the motion vectors
   7.3. The vectors of likelihoods are calculated and normalized by using the HMMs of the ending segments
   7.4. The vectors are passed to the corresponding NS nodes
   7.5. The nodes' beliefs are updated by the belief propagation algorithm
8. The gesture with the highest probability in the local belief of the root node is the best match Many bimanual movements are periodic in essence. Clapping and drumming are some examples. In the environments where the bimanual movements are used as a communication method, e.g., Virtual Reality, concatenated periodic movements should be recognized.

In one implementation, we use the Bayesian network described earlier to recognize concatenated periodic movements. The movements may be recognized correctly over the whole repetition periods. Further, gesture changes may be detected when different movements are concatenated. An experiment is presented to discuss an implementation.

Fifteen bimanual movements were created as if the hands were doing regular daily movements like clapping, signing Wednesday in the British Sign Language, knotting a string, turning over the leaves of a book, and some movements from other sign languages. For every movement we captured 10 samples for a total of 150 samples, that is, 150 videos that each contain many images (data points). Half of the samples (75) were treated as the training set, that is, 5 videos of each gesture were used as training data. By using Principal Component Analysis the eigenspaces were formed. By applying Vector Quantization 128 codewords for each eigenspace were extracted. By this number, each codeword represents approximately 100 data points in the training set. Two-states left-to-right Hidden Markov Models were created for the segments of the hand gestures. The HMM of every segment of a gesture was trained by the 5 samples in the training set.

Three bimanual gestures were selected to create concatenated periodic bimanual movements. From the 15 movements, first gesture number 3 was repeated 5 times. It was followed by gesture number 2 repeated 30 times, and followed by gesture number 5 repeated 41 times. Therefore, the first gesture is divided into 11 segments, including a beginning segment, and 5 occluded segments separated by 4 middle segments, and an end segment. The second gesture is divided into 61 segments, including a beginning segment, 30 occluded segments, 29 middle segments, and an end segment. The third gesture is divided into 83 segments, including a beginning segment, 41 occluded segments, 40 middle segments, and an end segment. Given the fact that the first segment in the graph of local beliefs represents the belief of initialization, the first gesture transition should appear in the $13^{th}$ segment (the beginning segment associated with the second gesture) and the second transition in the $74^{th}$ segment (the beginning segment associated with the third gesture).

Referring to FIG. 20($a$), the local belief of the root node is plotted. A plot 2010 shows multiple graphs (15 graphs) including a first graph 2020 for the first gesture, rising at approximately segment 2 to a belief of approximately 1, and falling at approximately segment 12 to a belief of approximately 0. Plot 2010 also shows a second graph 2030 for the second gesture, rising at approximately segment 13 to a belief of approximately 1, and falling at approximately segment 73 to a belief of approximately 0. Plot 2010 also shows a third graph 2040 for the third gesture, rising at approximately segment 74 to a belief of approximately 1, and stopping at approximately segment 156.

Plot 2010 shows a fourth graph 2050 having a positive belief around, for example, segment 40. Second graph 2030 also includes several dips, particularly around segment 40. Importantly, at various points around segment 40, the belief is higher for the gesture associated with fourth graph 2050 than for the second gesture. The gestures are correctly recognized most of the time. Also, the gesture transitions are detected properly. However, as suggested above, particularly in the graph of the second gesture, the belief is not very stable and it varies such that at some points it falls below the graph of other gestures. This happens when the partial gestures of one or two hands are recognized incorrectly. Although the confusion can be treated as temporary spikes, an algorithm may determine that the gesture has changed at some points. Each of the graphs 2020, 2030, 2040, and 2050 is isolated in one of FIGS. 20($b$)-($e$), respectively.

An implementation avoids these confusing spikes by changing the belief propagation algorithm. Specifically, the previous belief of the root node is given greater weight so that temporary confusing evidence does not change the belief easily.

To give greater weight to a previous belief, we add memory to the root node of the network. This is done, for example, by treating the current belief of the root node as the prior probability of the node in the next step. When a hypothesis (that one of the gestures in the vocabulary is the correct gesture) is strengthened multiple times by the messages received from the HMMs, many strong pieces of evidence are needed to change this belief.

Figure 21:
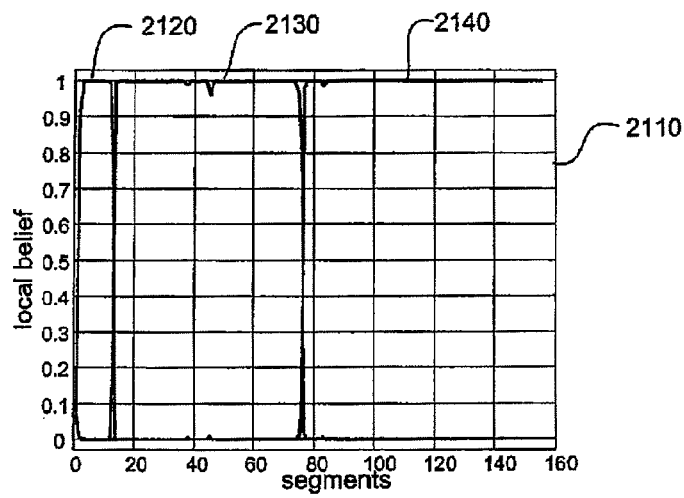
FIG. 21 graphs the local belief of the root node with limited memory for the three concatenated bimanual movements of FIG. 20.

However, replacing the prior probability of the root node with the node belief can cause numerical underflows while a gesture is repeated several times. This may result in delays in detecting gesture transitions. To avoid the numerical underflows and confusing spikes we may restrict the memory. By this restriction, the prior probabilities of the root node cannot fall below a certain limit. Referring to FIG. 21, the results of the network with limited memory with the limit of $10^{-3}$ are presented.

In a plot 2110 of FIG. 21, the confusing spikes are avoided while delays in detecting the transition points are a few units (segments). The first and second transitions are detected one segment and two segments respectively after the actual transition points. FIG. 21 shows a first graph 2120, a second graph 2130, and a third graph 2140, corresponding to the first, second, and third gestures, respectively.

Figure 22:
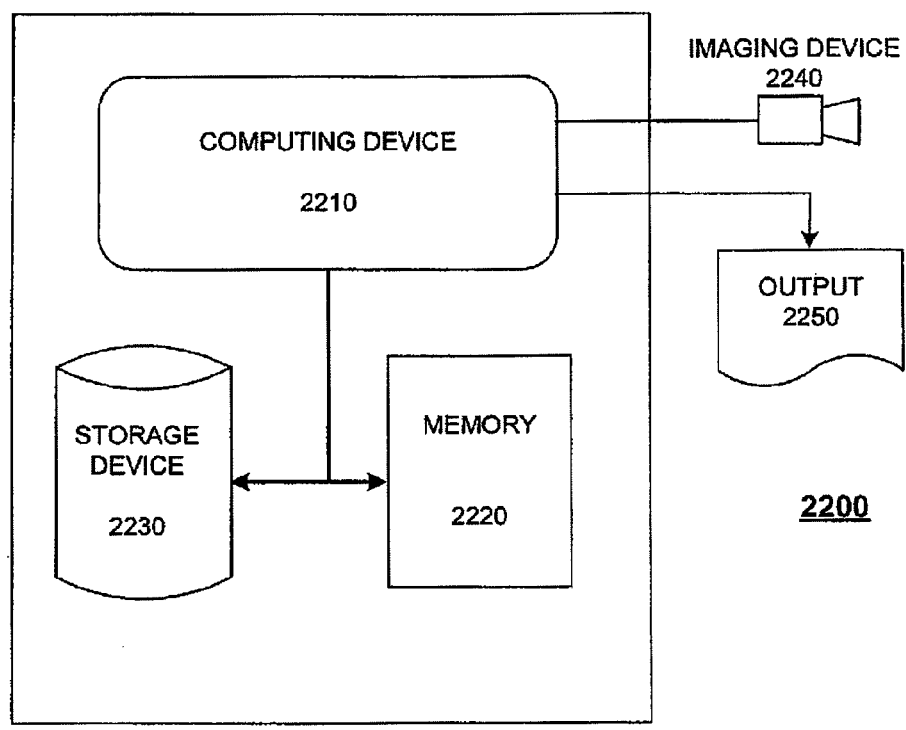
FIG. 22 shows a hardware implementation.

Referring to FIG. 22, an imaging device 2240 (e.g., a CCD camera) captures sequences of images of a person doing a bimanual movement. The images are transferred to a computing device 2210 running the algorithms described. The memory 2220 keeps the information required for the algorithms, and the storage device 2230, such as, for example, a database, contains the training information required by the tracking and recognition algorithms. Storage device 2230 may also store the code for the algorithms.

During a training phase the training information of the tracking algorithm including the threshold values and distributions are stored in the storage device 2230. Also, the HMMs and the transition values of the proposed Bayesian network are trained and stored in the storage device 2230.

In the recognition phase, the trained information from the database are partially or completely extracted and stored in the memory 2220, so that the computing device 2210 can access them very quickly to track the hands and recognize the movements in real-time. The results of the recognition are transferred to the output device 2250.

Figure 23:
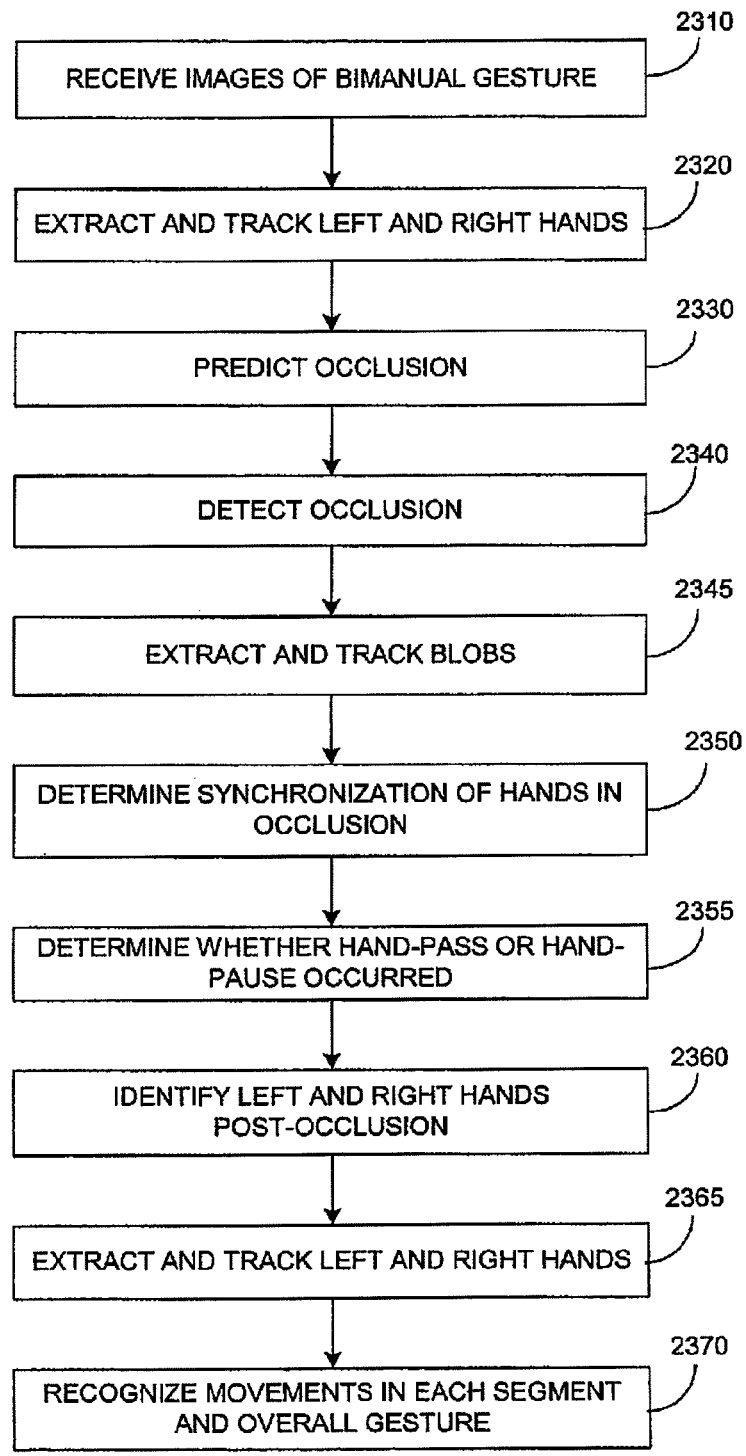
FIG. 23 illustrates a process for recognizing a bimanual gesture.

Referring to FIG. 23, a process 2300 may be used to recognize bimanual gestures, and includes many operations discussed in this disclosure. Process 2300 includes receiving or otherwise accessing a series of images of a bimanual gesture (2310). Left and right hands are extracted and tracked from the received images (2320) and a hand-hand occlusion is predicted (2330). The hand-hand occlusion is detected (2340) and a single blob including both hands is extracted and tracked from the images in which the occlusion exists (2345). The synchronization of the left and right hands during the occlusion is determined (2350), the behavior of the hands (whether they passed each other or they paused/collided and returned) is recognized (2355), and the left and right hands are identified after the occlusion ends (2360). The left and right hands are extracted and tracked post-occlusion (2365). The movements in each of the segments (pre-occlusion, occlusion, and post-occlusion) are recognized, and the overall gesture is recognized (2370).

Determining the synchronization of the left and right hands (2350) may generally involve determining any relationship between the two hands. The relationship may be, for example, a relationship between component-velocities of parallel sides of a rectangle surrounding a blob, as described earlier. In other implementations, however, the relationship relates to other characteristics of the hands, or the single blob.

One variation of process 2300 may be performed by a plug-in to a bimanual gesture recognition engine. The plug-in may perform some variation of tracking a blob (2345), determining a type of synchronization (2350), and determining whether the two hands change their direction of travel during the occlusion period. Such a plug-in may be used with a gesture recognition engine that is unable to deal with hand-hand occlusion. In such a scenario, the gesture recognition engine may track the left and right hands until a hand-hand occlusion occurs, then call the plug-in. The plug-in may track the blob, determine if the two hands changed direction during the occlusion, and then transfer control of the recognition process back to the gesture recognition engine. In transferring control back to the gesture recognition engine, the plug-in may tell the gesture recognition engine whether the two hands changed direction during the occlusion. Thus, the gesture recognition engine can reacquire the left and right hands and continue tracking the two hands.

Implementations may attempt to discern whether two occluded hands have passed each other, have collided with each other, or have merely paused. The result of a pause may typically be the same as the result of a collision; that the two hands return to the directions from which they came. The velocity profile of a "pause" may be similar to the velocity profile of a "collision," and any differences may be insignificant given expected noise. However, implementations may attempt to separately detect a "collision" and a "pause."

The directions referred to with respect to various implementations may refer, for example, to the direction of the velocity vector or the direction of a component of the velocity vector. The direction of a velocity vector may be described as being, for example, a left direction, a right direction, a top direction, a bottom direction, and a diagonal direction. Components of a velocity vector may include, for example, a horizontal component and a vertical component.

Implementations may be applied to tracking bimanual gestures performed by a single person using the person's left and right hands. Other implementations may be applied to gestures being performed by, for example, two people each using a single hand, one or more robots using one or more gesturing devices, or combinations of people and robots or machines, particularly if a coordination similar to the bimanual coordination exists between the hands.

Implementations may include, for example, a process, a device, or a device for carrying out a process. For example, implementations may include one or more devices configured to perform one or more processes. A device may include, for example, discrete or integrated hardware, firmware, and software. A device may include, for example, computing device 2210 or another computing or processing device, particularly if programmed to perform one or more described processes or variations thereof. Such computing or processing devices may include, for example, a processor, an integrated circuit, programmable logic device, a personal computer, a personal digital assistant, a game device, a cell phone, a calculator, and a device containing a software application.

Implementations also may be embodied in a device that includes one or more computer readable media having instructions for carrying out one or more processes. The computer readable media may include, for example, storage device 2230, memory 2220, and formatted electromagnetic waves encoding or transmitting instructions. Computer readable media also may include, for example, a variety of non-volatile or volatile memory structures, such as, for example, a hard disk, a flash memory, a random access memory, a read-only memory, and a compact diskette. Instructions may be, for example, in hardware, firmware, software, and in an electromagnetic wave.

Thus, computing device 2210 may represent an implementation of a computing device programmed to perform a described implementation, and storage device 2230 may represent a computer readable medium storing instructions for carrying out a described implementation.

A number of implementations have been described. Nevertheless, it will be understood that various modifications may be made. For example, elements of one or more implementations may be combined, deleted, modified, or supplemented to form further implementations. Accordingly, other implementations are within the scope of the following claims.

What is claimed is:

1. A device comprising:
   a memory, and
   a computing device coupled with the memory and configured to:
      determine that a first hand and a second hand are occluded, the first hand having come from a first direction and the second hand having come from a second direction;
      track movement of the occluded hands, the occluded hands being tracked as a unit;
      determine a type of synchronization characterizing the occluded hands based on the tracked movement of the occluded hands;
      determine that the first hand and the second hand are no longer occluded; and
      distinguish, after determining that the first hand and the second hand are no longer occluded, the first hand from the second hand based on the determined type of synchronization.

2. The device of claim 1, wherein the computing device is further configured to recognize a gesture based on the tracked movement of the occluded hands.

3. The device of claim 1, wherein the computing device is further configured to execute instructions that cause the device to determine whether the first hand and the second hand change their direction of travel during a period in which the first hand and the second hand are occluded.

4. The device of claim 3, wherein:
   tracking the movement of the occluded hands comprises tracking movement of a rectangle formed to surround the occluded hands, and
   determining whether the first hand and the second hand change their direction of travel comprises determining a measure of the occluded hands' velocities based on velocities of one or more sides of the rectangle.

5. The device of claim 4, wherein determining whether the first hand and the second hand change their direction of travel is based on one or more probability distributions of the measure of the occluded hands' velocities.

6. The device of claim 4, wherein determining whether the first hand and the second hand change their direction of travel is based on whether the measure of the occluded hands' velocities goes below a threshold.

7. The device of claim 1, wherein determining the type of synchronization comprises determining a measure of the occluded hands' velocities.

8. The device of claim 7 wherein the measure of the occluded hands' velocities comprises a standard deviation of a difference of velocities of sides of a shape formed to surround the occluded hands.

9. A non-transitory computer-readable storage medium encoded with executable instructions that, when executed, cause a computing device to perform operations comprising:
   determining that a first hand and a second hand are occluded, the first hand having come from a first direction and the second hand having come from a second direction;
   tracking movement of the occluded hands, the occluded hands being tracked as a unit;
   determining a type of synchronization characterizing the occluded hands based on the tracked movement of the occluded hands;
   determining that the first hand and the second hand are no longer occluded; and distinguishing, after determining that the first hand and the second hand are no longer occluded, the first hand from the second hand based on the determined type of synchronization.

10. The non-transitory computer-readable storage medium of claim 9, further comprising instructions for recognizing a gesture based on the tracked movement of the occluded hands.

11. The non-transitory computer-readable storage medium of claim 9, further comprising instructions for determining whether the first hand and the second hand change their direction of travel during a period in which the first hand and the second hand are occluded.

12. The non-transitory computer-readable storage medium of claim 11, wherein:
the instructions for tracking the movement of the occluded hands include instructions for tracking movement of a rectangle formed to surround the occluded hands, and the instructions for determining whether the first hand and the second hand change their direction of travel include instructions for determining a measure of the occluded hands' velocities based on velocities of one or more sides of the rectangle.

13. The non-transitory computer-readable storage medium of claim 12, wherein the instructions for determining whether the first hand and the second hand change their direction of travel are configured to cause the determination to be based on whether the measure of the occluded hands' velocities goes below a threshold.

14. The non-transitory computer-readable storage medium of claim 9, wherein the instructions for determining the type of synchronization include instructions for determining a measure of the occluded hands' velocities.

15. An apparatus comprising:
means for determining that a first hand and a second hand are occluded, the first hand having come from a first direction and the second hand having come from a second direction;
means for tracking movement of the occluded hands, the occluded hands being tracked as a unit;
means for determining a type of synchronization characterizing the occluded hands based on the tracked movement of the occluded hands;
means for determining that the first hand and the second hand are no longer occluded; and
means for distinguishing, after determining that the first hand and the second hand are no longer occluded, the first hand from the second hand based on the determined type of synchronization.

16. The apparatus of claim 15, further comprising means for recognizing a gesture based on the tracked movement of the occluded hands.

17. The apparatus of claim 15, further comprising means for determining whether the first hand and the second hand change their direction of travel during a period in which the first hand and the second hand are occluded.

18. The apparatus of claim 17, wherein:
the means for tracking movement of the occluded hands include means for tracking movement of a rectangle formed to surround the occluded hands, and
the means for determining whether the first hand and the second hand change their direction of travel include means for determining a measure of the occluded hands' velocities based on velocities of one or more sides of the rectangle.

19. The apparatus of claim 18, wherein the means for determining whether the first hand and the second hand change their direction of travel are configured to cause the determination to be based on whether the measure of the occluded hands' velocities goes below a threshold.

20. The apparatus of claim 15, wherein the means for determining the type of synchronization include instructions for determining a measure of the occluded hands' velocities.

* * * * *